(12) United States Patent
Harada et al.

(10) Patent No.: US 8,301,035 B2
(45) Date of Patent: Oct. 30, 2012

(54) OPTICAL COMMUNICATION APPARATUS, CONTROL APPARATUS, AND METHOD FOR CONTROLLING OPTICAL OUTPUT

(75) Inventors: Keisuke Harada, Fukuoka (JP); Taku Yoshida, Fukuoka (JP); Yoshiyuki Maeda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 482 days.

(21) Appl. No.: 12/558,780

(22) Filed: Sep. 14, 2009

(65) Prior Publication Data

US 2010/0074629 A1 Mar. 25, 2010

(30) Foreign Application Priority Data

Sep. 25, 2008 (JP) ................................. 2008-246796
Jul. 9, 2009 (JP) ................................. 2009-163171

(51) Int. Cl.
*H04B 10/12* (2006.01)
(52) U.S. Cl. ......... 398/195; 398/196; 398/197; 398/198
(58) Field of Classification Search ................... 398/182, 398/195
See application file for complete search history.

(56) References Cited

U.S. PATENT DOCUMENTS

| 5,943,352 | A | * | 8/1999 | Fee | ................... | 372/32 |
| 6,483,625 | B2 | | 11/2002 | Shimura et al. | | |
| 6,590,686 | B1 | | 7/2003 | Sekiya et al. | | |
| 2004/0035851 | A1 | * | 2/2004 | Antoniou et al. | ............. | 219/509 |
| 2009/0021238 | A1 | * | 1/2009 | Ishikawa et al. | ................ | 324/95 |

FOREIGN PATENT DOCUMENTS

| JP | 2000-332696 | 11/2000 |
| JP | 2001-154160 | 6/2001 |
| JP | 2001-242397 | 9/2001 |
| JP | 2002-368693 | 12/2002 |
| JP | 3445176 | 9/2003 |
| JP | 2004-117966 | 4/2004 |
| JP | 2007-102816 | 4/2007 |
| WO | WO 01/03350 | 1/2001 |

OTHER PUBLICATIONS (International Application No. WO 01/03350) corresponding to Reference AA (U.S. Patent No. 6,483,625).
(Japanese Laid-Open Patent No. 3445176) corresponding to Reference AB (U.S. Patent No. 6,590,686).
Japanese Patent Office Action dated Nov. 16, 2010 for corresponding Japanese Patent Application No. 2009-163171.

* cited by examiner

*Primary Examiner* — Danny Leung
(74) *Attorney, Agent, or Firm* — Staas & Halsey LLP

(57) ABSTRACT

An optical communication apparatus includes an optical signal transmitter for outputting an optical signal, an optical switch device for switching a route of the optical signal, a drive controller for supplying a drive current for controlling a route switching to the optical switch device, a cooling device for cooling the optical switch device on the basis of a control signal, a temperature controller for transmitting the control signal to the cooling device in order to keep a measured temperature at a specific temperature, where the measured temperature is related to a temperature of the optical switch device.

12 Claims, 29 Drawing Sheets

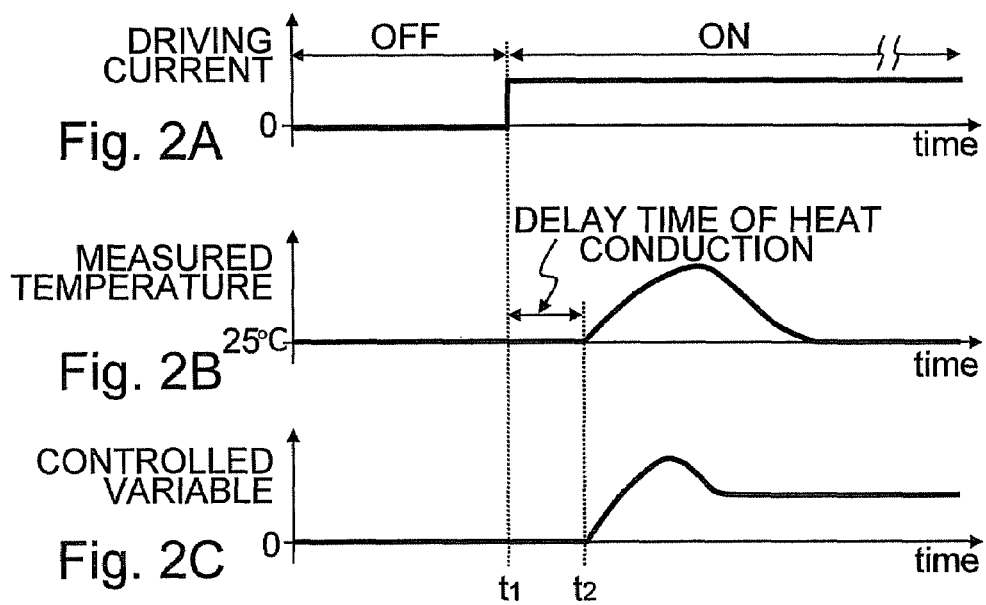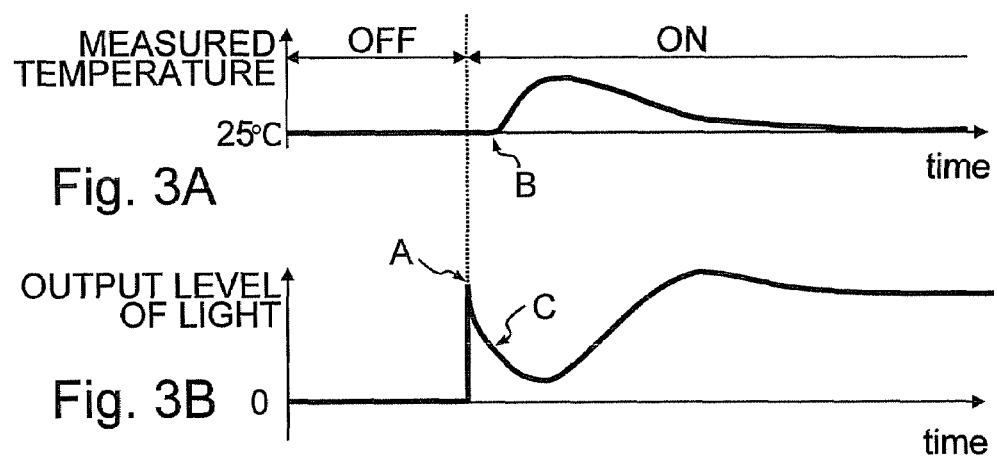

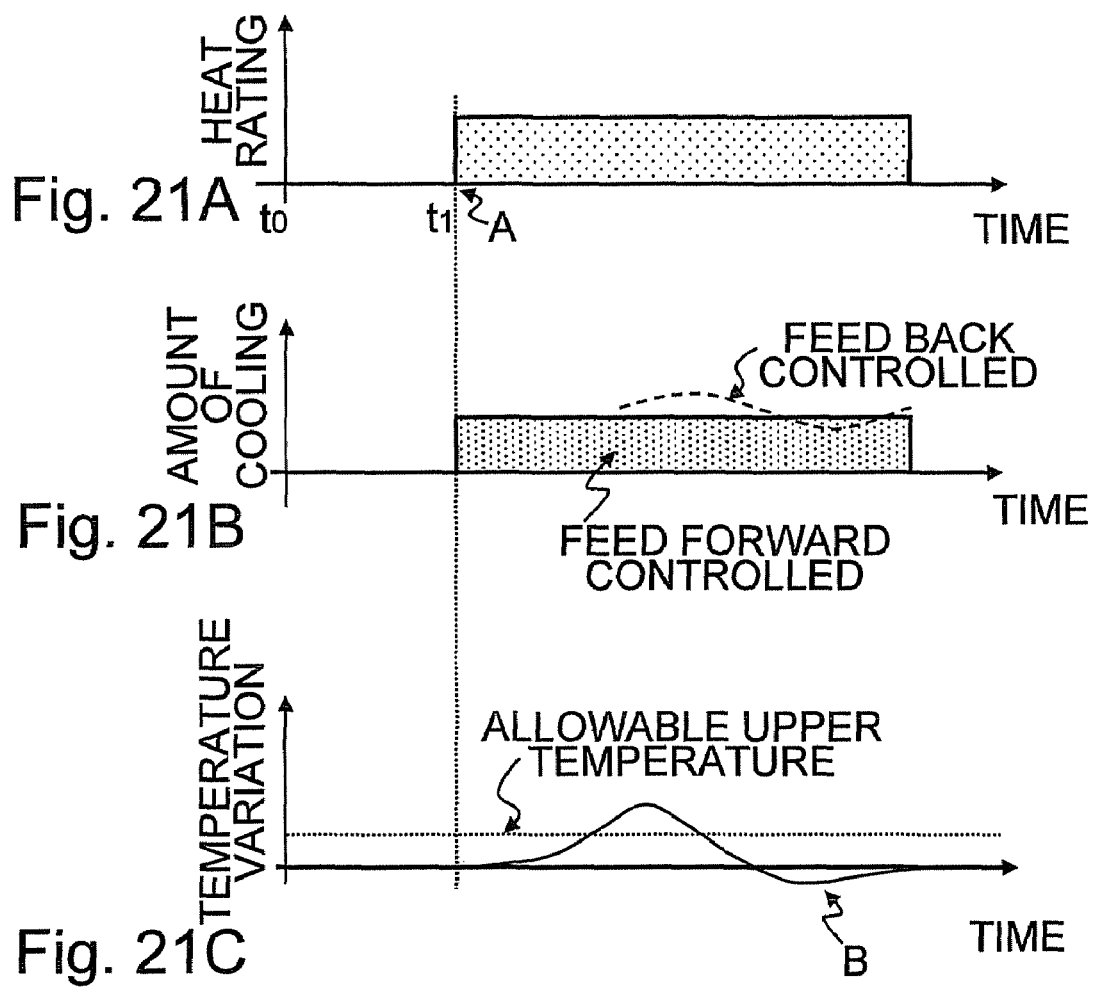

| 1 | 15000 |
|---|---|
| 2 | 15023 |
| 3 | 15080 |
| 4 | 15174 |
| 5 | 15202 |
| ⋮ | ⋮ |
| N | 15200 |

Fig. 23

| 1 | 32640 |
|---|---|
| 2 | 32650 |
| 3 | 32665 |
| 4 | 32762 |
| 5 | 32748 |
| ⋮ | ⋮ |
| N | 32700 |

Fig. 24

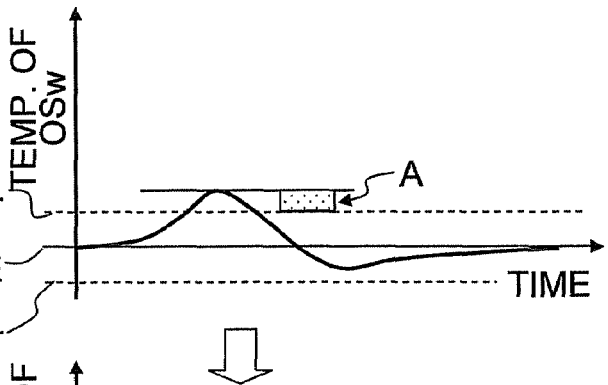
Fig. 28A
Fig. 28B
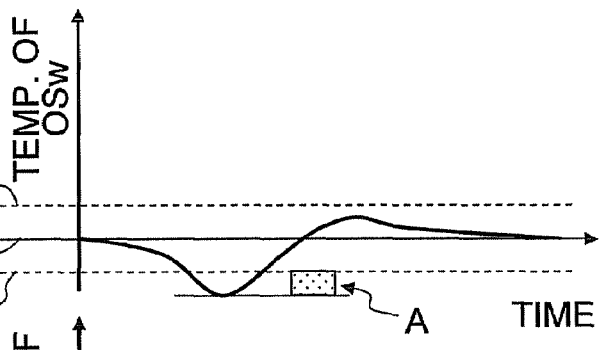
Fig. 29A
Fig. 29B

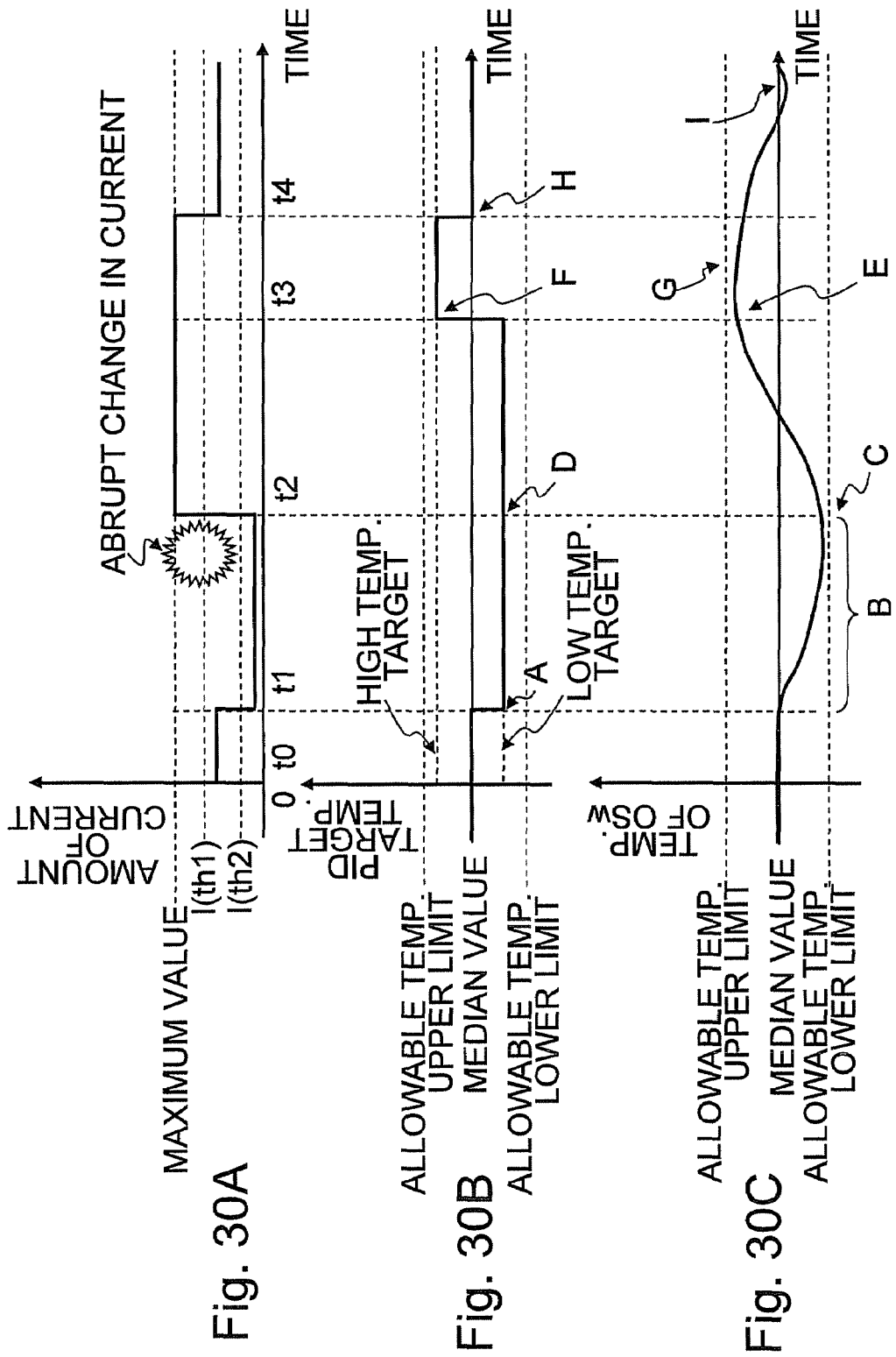

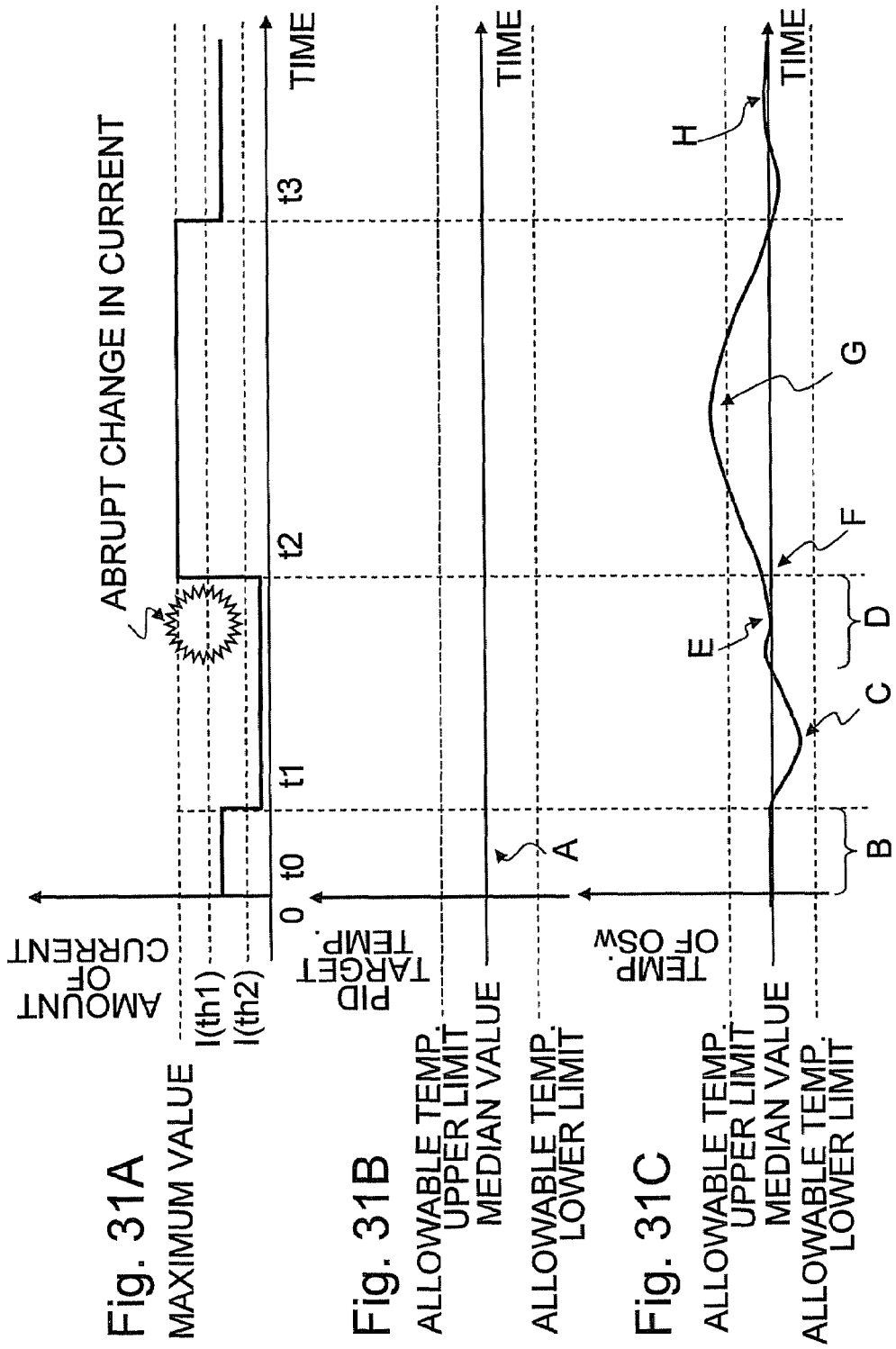

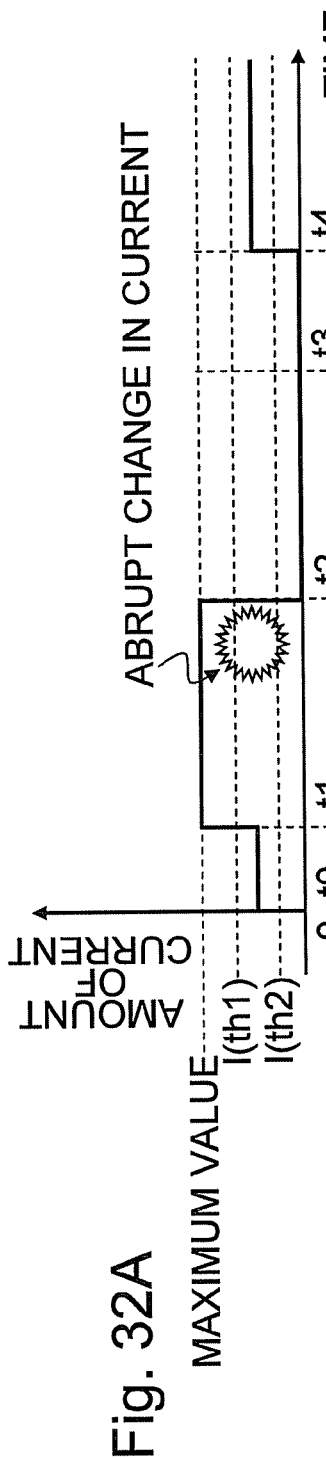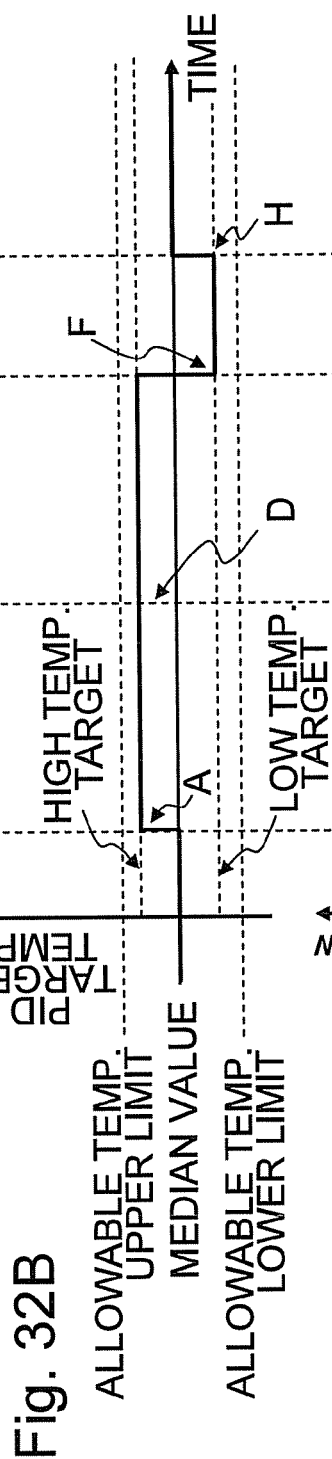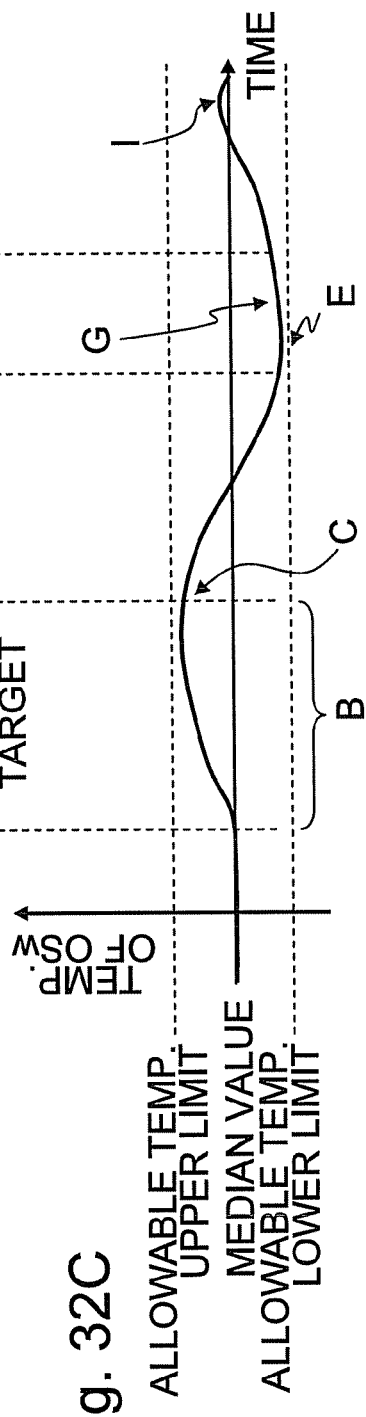

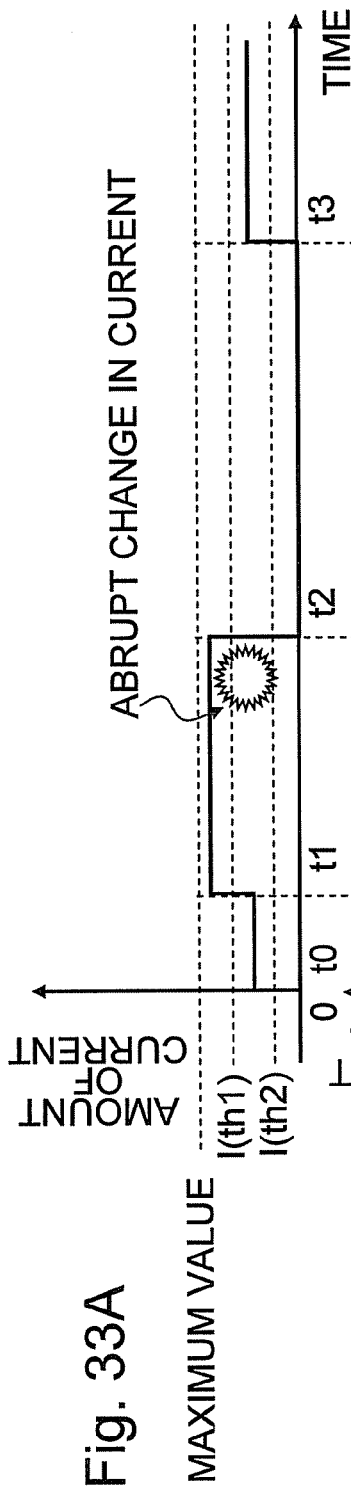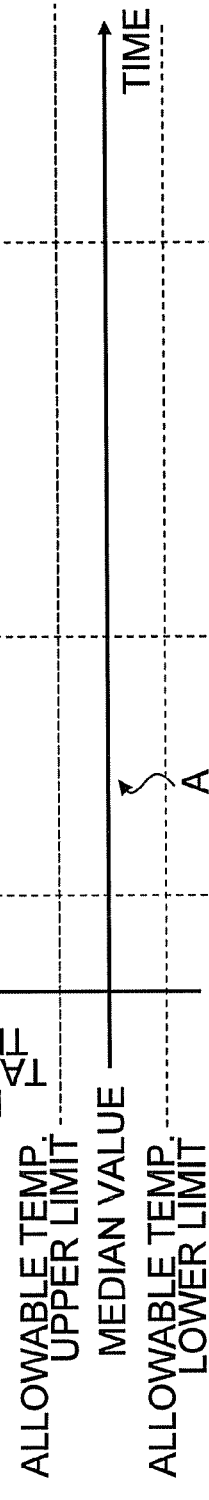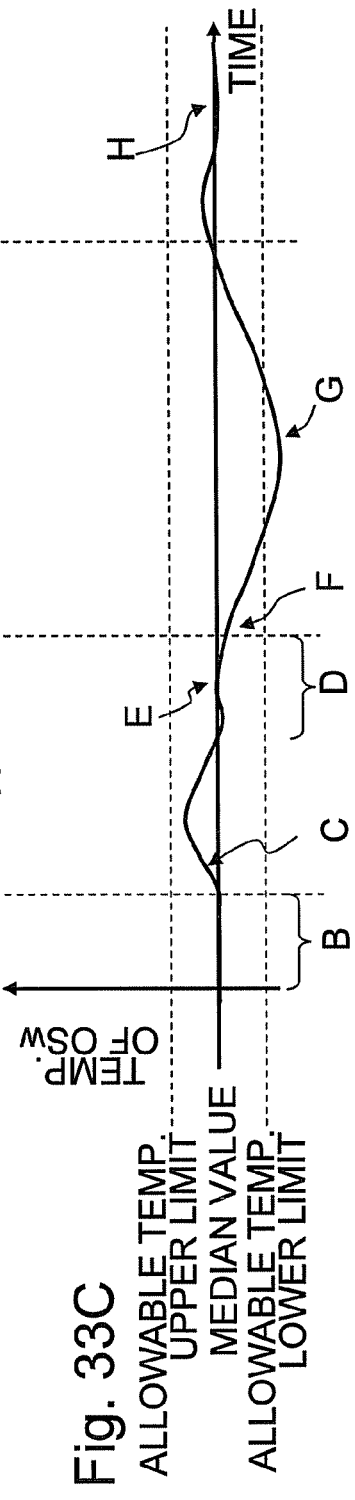

| STATE OF CURRENT | PREVIOUS STATE OF CURRENT | STATE OF TEMPERATURE | | | TARGET TEMPERATURE |
|---|---|---|---|---|---|
| LARGE | LARGE | CONVERGING | t3 IN FIG. 30A | PREPARAING FOR A SHARP DECREASE IN THE AMOUNT OF CURRENT | HIGH TEMPERATURE |
| | | INCREASING | t2 TO t3 IN FIG. 30A | MAINTAINING FOR A SHARP DEREASE IN THE AMOUNT OF CURRENT | LOW TEMPERATURE |
| | SMALL | | t2 IN FIG. 30A | MAINTAINING THE LOW TEMPERATURE | LOW TEMPERATURE |
| | MEDIUM | | t2 IN FIG. 32A | GUIDING TO HIGH TEMPERATURE | HIGH TEMPERATURE |
| SMALL | SMALL | CONVERGING | t3 IN FIG. 32A | PREPARING FOR A SHARP INCREASE IN THE AMOUNT OF CURRENT | LOW TEMPERATURE |
| | | DECREASING | t2 TO t3 IN FIG. 32A | MAINTAINING THE HIGH TEMPERATURE | HIGH TEMPERATURE |
| | LARGE | | t2 TO t3 IN FIG. 32A | MAINTAINING THE HIGH TEMPERATURE | HIGH TEMPERATURE |
| | MEDIUM | | t1 IN FIG. 30A | GUIDING TO THE LOW TEMPERATURE | LOW TEMPERATURE |
| MEDIUM | | | | | MEDIAN VALUE |

Fig. 34

OPTICAL COMMUNICATION APPARATUS, CONTROL APPARATUS, AND METHOD FOR CONTROLLING OPTICAL OUTPUT

CROSS-REFERENCE TO RELATED APPLICATIONS

This application is based upon and claims the benefit of priority of the prior Japanese Patent Applications No. 2008-246796, filed on Sep. 25, 2008 and No. 2009-163171, filed on Jul. 9, 2009, the entire contents of which are incorporated herein by reference.

FIELD

The embodiments discussed herein are related to an optical communication apparatus, a control apparatus therefor, and a control method for stabilization of an optical power.

BACKGROUND

A plurality of optical routes in an optical network are usually switched with use of optical switch devices. An optical switch device is simply referred as an optical switch. As the increasing of data traffic, optical switches have been developed allowing to switch with faster rate. An optical switch called a current drive type, for example, amplifies optical signals by injected current and enables fast switching by on-off controlling of the injection current.

The performances of the optical switches are generally so liable to be suffered from the operating temperature to vary the output amplitude of optical signal. Therefore, the optical communication apparatus with the optical switch usually performs thermal control of the optical switches. Japanese Laid-open Patent Publication 2004-117966 discloses an optical transmission apparatus which includes a measurement portion for measuring a temperature of an optical switch and a thermo-controlling portion for controlling the temperature of the optical switch.

SUMMARY

According to an aspect of the invention, an optical communication apparatus includes an optical signal transmitter for outputting an optical signal, an optical switch device for switching a route of the optical signal, a drive controller for supplying a drive current for controlling a route switching to the optical switch device, a cooling device for cooling the optical switch device on the basis of a control signal, a temperature controller for transmitting the control signal to the cooling device in order to keep a measured temperature at a specific temperature, where the measured temperature is related to a temperature of the optical switch device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 2A to 2C are diagrams illustrating an optical output stabilization method only using feedback control;

FIGS. 3A and 3B are diagrams illustrating the relationship a measured temperature with a thermistor and an output level of the optical switch device;

FIGS. 21A to 21C illustrate a problem to be solved in a system in which feedback and feedforward control is performed as the thermo-control of the optical switch;

FIG. 23 is a diagram illustrating an example of an amount-of-current monitor table;

FIG. 24 is a diagram illustrating an example of a temperature monitor table;

FIGS. 28A and 28B are diagrams illustrating a low temperature value;

FIGS. 29A and 29B are diagram illustrating a high temperature value;

FIGS. 30A to 30C are diagrams illustrating a thermo-control when the current increases abruptly;

FIGS. 31A to 31C are diagram illustrating an example of a thermo-control using a fixed target temperature;

FIGS. 32A to 32C are diagrams illustrating an example of a thermo-control when the current decreases abruptly;

FIGS. 33A to 33C are diagrams illustrating an example of a thermo-control using a fixed target temperature;

FIG. 34 is a diagram illustrating an example of an algorithm for determining a target temperature.

DESCRIPTION OF EMBODIMENTS

The control apparatus disclosed in the previously cited Patent application may be sufficient to adequately control the optical output because of the follows.

It is usually known that the heat conduction takes a time for conducting the heat generated by the optical switch to a measuring device. Namely the current temperature of the optical switch will be measured a little later by the device. Since the thermo-control base on the temperature measurement such as disclosed in the cited reference will perform a thermo-control for the optical switch with a time lag caused by the heat conduction, the conventional method for controlling the optical switch may be adequate to control the switch for more stable optical output, because the operating temperature of the switch suffers largely to the current drive type optical switch than the conventional optical switch device. Since the current drive type optical switch can perform a high rate switching operation which leads to generation of a larger amount of heat, the use of the switch needs more accurate thermo-control for a high rate switching operation.

One of preferable communication apparatus to solving the problem in a conventional optical communication, it is preferable for an optical communication apparatus to include an optical signal transmitter for transmitting an optical signal, an optical switch device for change a route of the optical signal, a drive controller for supplying a drive current to the optical switch device to control an operation for changing the route, a thermal controller for transmitting a control signal for regulate a measured temperature of the optical switch device, and a cooling device for cooling the optical switch device on the basis of the control signal.

The embodiments according to the present invention will be explained with drawings. The optical switch devices of current drive type will be used in the embodiments, while optical switch of other type may be used instead of the optical switch device of current drive type.

The First Embodiment

Figure 1:
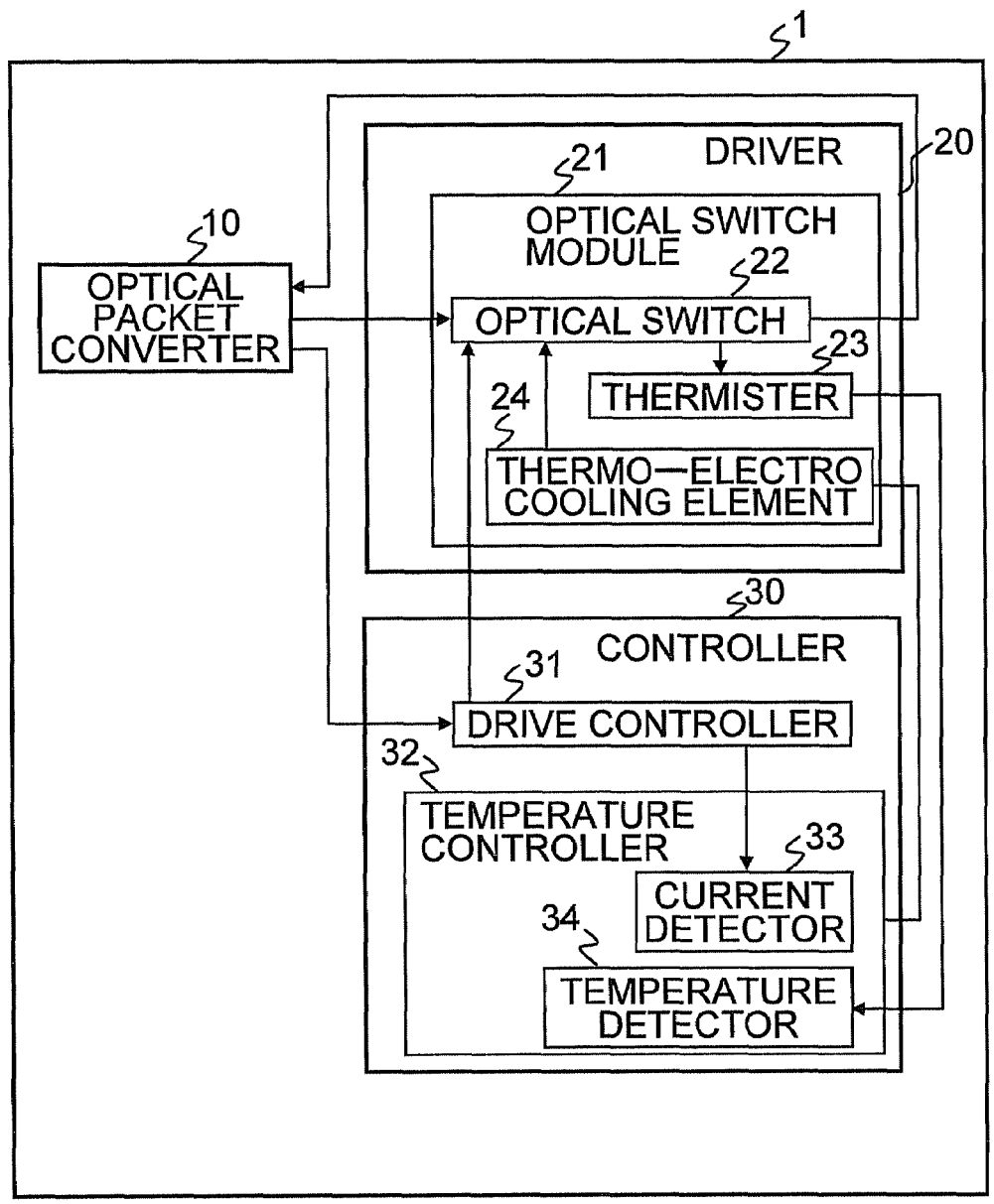
FIG. 1 is a block diagram illustrating a schematic configuration of an optical communication apparatus according to the first embodiment.

The schematic configuration of the optical communication apparatus according to the first embodiment will be explained by referring to FIG. 1 which illustrates the block diagram of the optical communication apparatus. The optical communication apparatus includes the optical packet converter 10, the driver 20, and the controller 30. The optical packet converter 10 serves as a function of an optical signal transmitter such that receiving the data of information from a computer node (not illustrated) such as a super computer and outputting optical signals corresponding to the data. The driver 20 is an apparatus for switching the route for the optical signals. The controller 30 serves a controller for controlling the whole of the optical communication apparatus 1, switching the route of the optical signals, and thermo-controlling of the optical switch device 22.

The driver 20 includes the optical switch module 21 in which are provided the optical switch device 22 for switching the route of the optical signals, a thermistor for measuring a temperature around the optical switch device 22, and the thermo-electro cooling element 24.

The controller 30 includes the drive controller 31 and the temperature controller 32. The drive controller 31 controls the optical switch device 22 so as to change the route according to the command issued from the optical packet converter 10. The temperature controller 32 includes the current detector 33 and the temperature detector 34, by which the temperature controller 32 performs thermo-control for the optical switch device 22 through a controlling signal to the thermo-electro cooling element 24. The current detector 33 detects a current flow to the optical switch device 22 and the temperature detector 34 detects a temperature corresponding to the change of value of resistance of the thermistor 23, where the temperature is treated as the temperature of the optical switch device 22 because of the thermistor 23 and the optical switch device 22 are close to each other on the same base.

The optical switch device 22 using in the embodiment is a drive current type one which functions as a gate for ON-OFF of the optical signal in response to the drive current injected into the optical switch device 22. The drive controller 31 applies or injects the drive current into the switch device 22 according to the signal from the optical packet converter 10 and the optical switch device turns to ON state.

The temperature controller 32 issues a control signal to the thermo-electro cooling element 24 for controlling the temperature of the optical switch device 22 at a desired temperature according to the temperature detected by the temperature detector 34. Further, the temperature controller 32 issues a control signal to the thermo-electro cooling element 24 for controlling the temperature of the optical switch device 22 at a desired temperature when the temperature detector detects the drive current flow, then the thermo-electro cooling element 24 as a cooler cools the optical switch device 22 on the basis of these control signals.

As described above, in the present embodiment, the temperature controller 32 performs temperature control for the optical switch device 22 in a manner of a feedforward control and a feedback control on the basis of the results detected by the current detector 33 and the temperature detector 34, respectively.

Figure 4A:
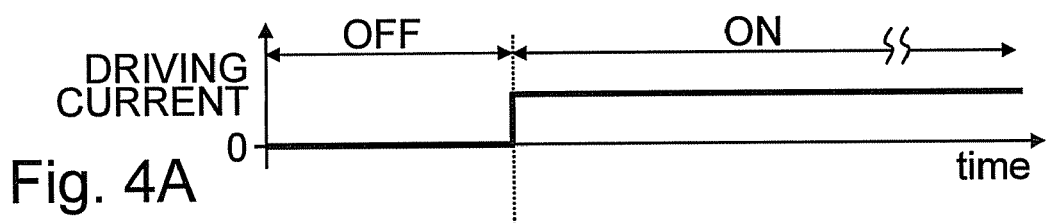
FIGS. 4A to 4C are diagrams illustrating the optical output stabilization method according the first embodiment.
Figure 4B:
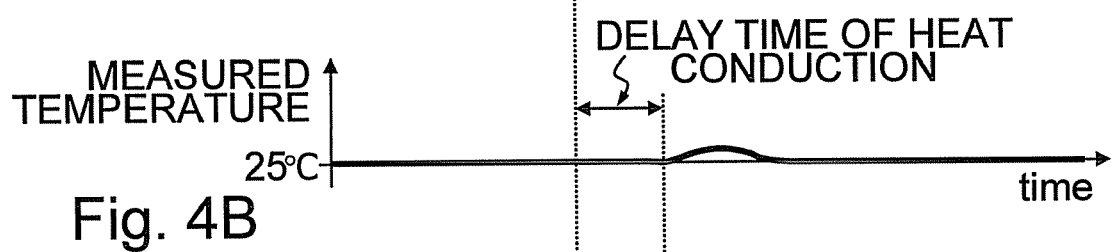
Figure 4C:
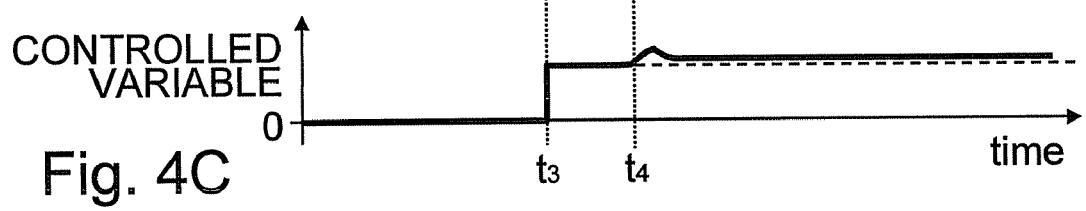

The thermo-control with a feedback control alone is compared with the control for the method for stabilization of optical output according to the present embodiment in order to make clear the difference between these thermo-control systems. FIGS. 2A to 2C illustrate the diagrams explaining the thermo-control using the feedback control for the optical switch device 22 and FIGS. 3A and 3B illustrate diagrams of the measured temperature by the thermistor 23 and the output level of light as an optical signal. FIGS. 4A to 4C illustrate diagrams for explaining the method of optical output stabilization according to the present embodiment.

In FIG. 2A, the drive current turns to ON state from OFF state at t1 and then the temperature of the optical switch 22 will rises due to the injection of the drive current. Since the heat conduction from the optical switch 22 to the thermistor 23 takes time, the thermo-control is not performed during the delay time of heat conduction (t2–t1). The thermo-control for the optical switch 22 begins at t2 at which the temperature rise is measured by the thermistor 23.

As illustrated in FIGS. 3A and 3B, due to the delay of the thermo-control for the optical switch 22, the output level of light (output level of the optical switch 22) rises to a predetermined or desired level at the moment (A) of turn to ON state of the optical switch 22, although the output level drops (c), because the thermo-control for the optical switch 22 is not performed until detecting the temperature rise (B). Similarly, it may be difficult to control appropriately the variation of the output level by the use of the feedback control alone.

For more appropriate control for the optical switch 22, the communication apparatus 1 adopts both of feedback and feedforward control for thermo-control of the optical switch 22. FIG. 4 depicts the relationship among the each timing and waveforms of drive the current injected to the optical switch 22, the measured temperature measured by the thermistor 23, and the controlled. Applying the drive current to the optical switch 22 or turning the optical switch 22 to On state, the current detector 33 detects the On state and the thermo-controller starts the thermo-control for the optical switch 22. By these steps, the thermo-control for the optical switch 22 may begin nearly simultaneously with applying the drive current to the optical switch 22. Therefore, the temperature rise in the optical switch 22 may be prevented or controlled more adequately than that by the feedback control alone, then the level of optical output may be stabilized.

Figure 5:
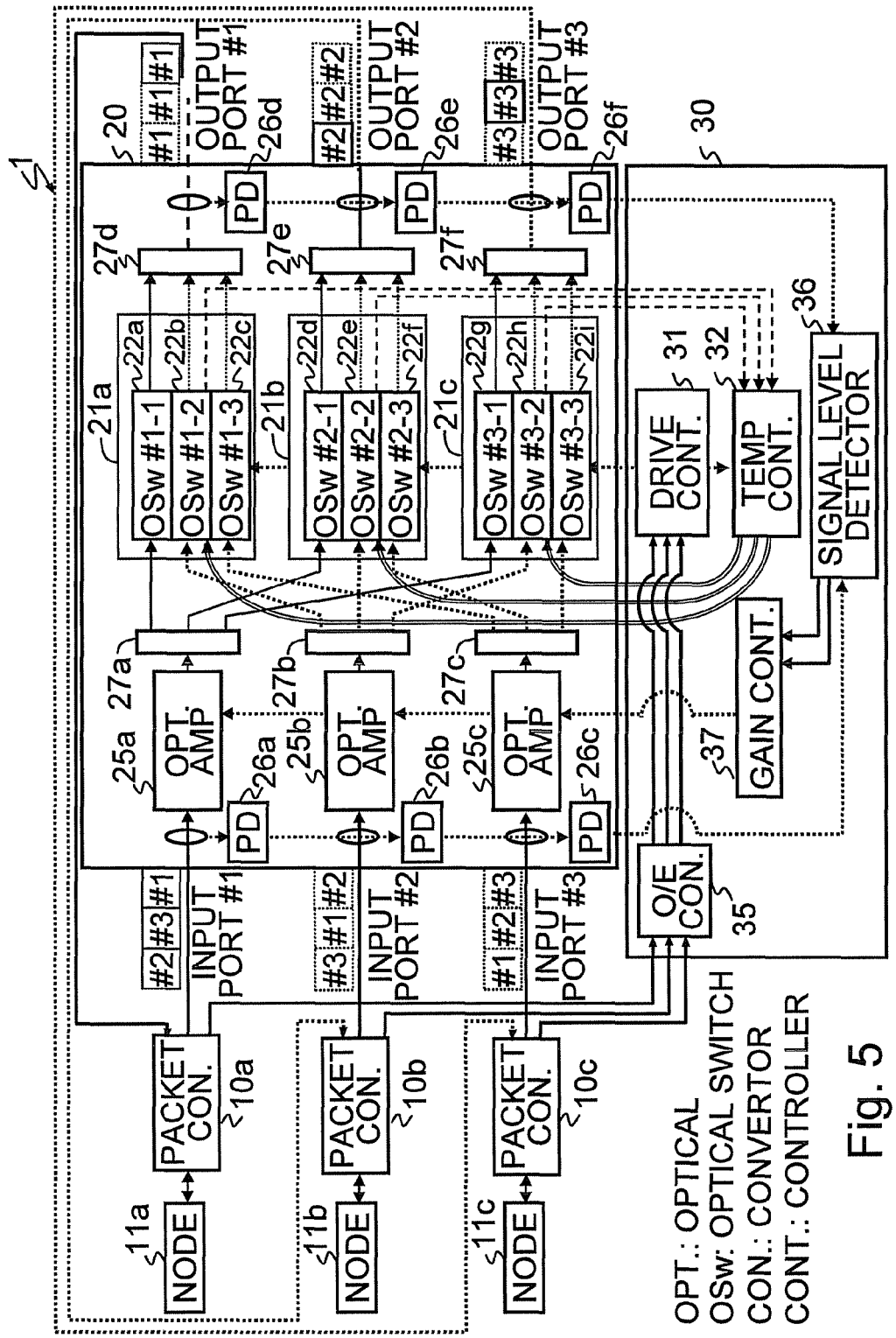
FIG. 5 is a block diagram illustrating the configuration of the optical communication apparatus.

The detail configuration of the optical communication apparatus 1 will be explained with the block diagram depicted in FIG. 5. In FIG. 5, the number of optical packet converters 10a to 10c, optical switch modules 21a to 21c is each three in this case, while the number of them is not limited to three.

The optical packet converters 10a to 10c perform the optical packet conversion by which converts the data from the computer nodes 11a to 11c to the optical signals in the packet form, then the optical signals in the packet flow into the driver 20. The optical packet converters 10a to 10c also send port connection information to drive controller 31. The port connection information includes the information for determining which of the optical switches 21a to 21c should be driven.

The driver 20 includes optical switch modules 21a to 21c, optical amplifiers 25a to 25c, photo-diodes (PD) 26a to 26f, and optical multiplexers 27a to 27f. The optical amplifiers 25a to 25c amplifies the optical signals from the optical packet converters 10a to 10c, PDs 26a to 26f convert optical signals to electrical signals to send to the signal level detector 36. The optical multiplexers 27a to 27c allocate the optical signals from the optical amplifiers 25a to 25c. Each of the optical multiplexers 27d to 27f combine the optical signals from each of the optical switches 21a to 21c.

Each of the optical switch modules 21a to 21c includes three optical switches 22a to 22c, 22d to 22f, and 22g to 22i, respectively, in the embodiment. The number of optical switch is not limited to three. That is, the detail explanation is done chiefly for a single optical switch in each of embodiments for the sake of clarity, but the embodiments may be applicable to a number of optical switches and the apparatus including the switches.

The controller 30 includes the drive controller 31, temperature controller 32, the optical to electrical (O/E) converter 35, the signal level detector 36, and the gain controller 37. O/E convertor 35 converts optical signals as the port connection information into electrical signals. The signal level detector 36 detects levels of optical signals on the basis of the electrical signals from the PDs 26a to 26c. The gain controller 37 decides each amplification factor of the optical amplifiers 25a to 25c to amplifying the optical signal. The drive controller 31 selects a desired one of the optical switches 22a to 22i to drive according to the port connection information so as to establish a connection between a desired input and output ports out of the input ports #1 to #3 and the output ports #1 to #3. Thereby each optical signal outputted from the individual optical packet converter 10a to 10c is transferred to the destined one of the computer nodes 11a to 11c.

Figure 6:
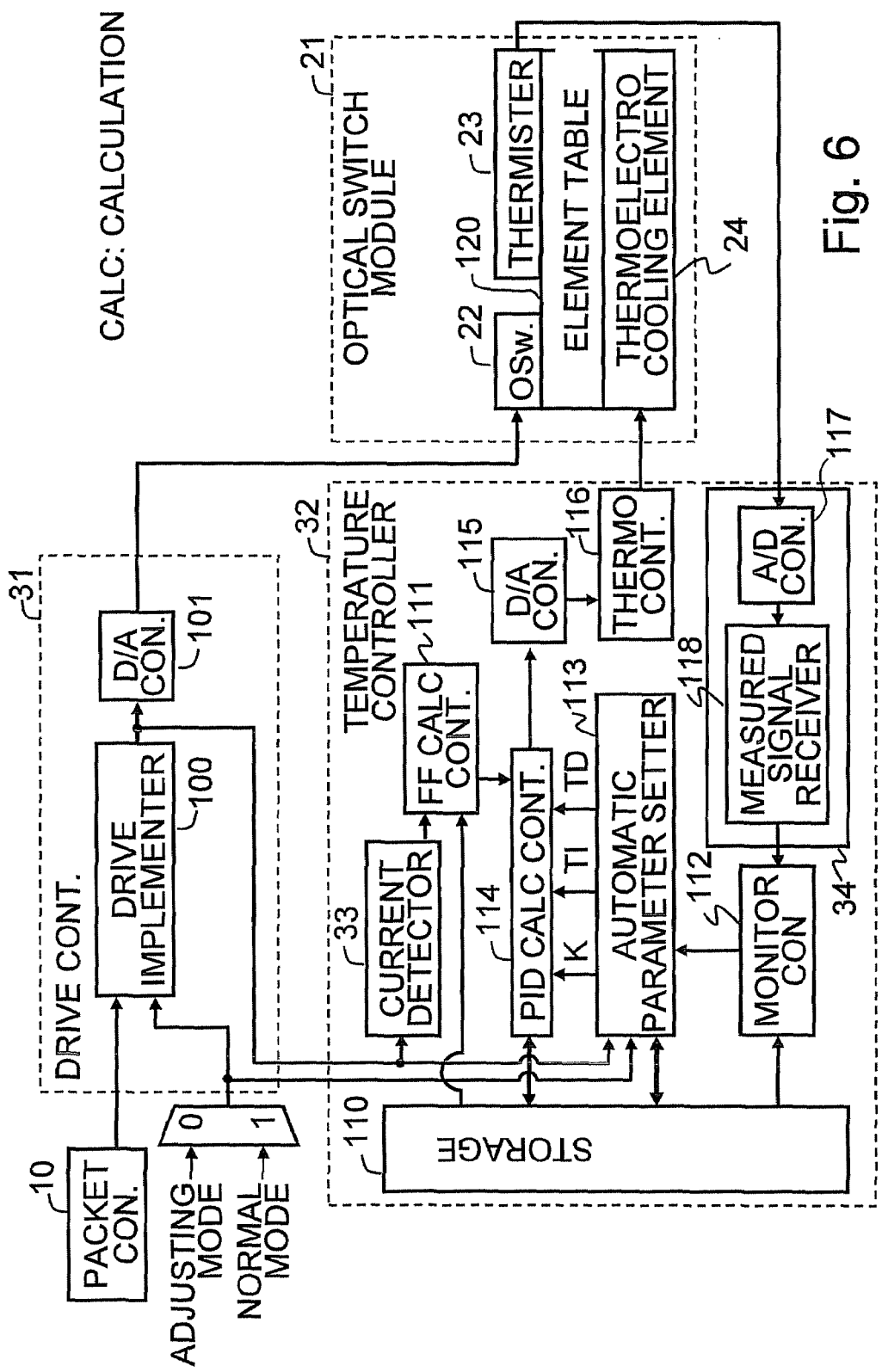
FIG. 6 is a block diagram illustrating the drive controller, the thermo controller, and the optical module depict in FIG. 5.

FIG. 6 illustrates more detailed configurations of the drive controller 31 and the temperature controller 32. As depicted in FIG. 6, the drive controller 31 includes the drive implementer 100 and the digital to analog converter 101. The drive implementer 100 selects one of the optical switches 22a to 22i to drive according the port connection information and sets the amount of drive current applied to the selected one and timing to apply the drive current to the selected one. The drive implementer 100 also sends to D/A converter 101 an electric digital signal which includes the selected one of the optical switches 22a to 22i, the amount of drive current, and the timing as information. Then the D/A converter 101 converts the electrical digital signal into an analog signal to send to the optical switches 22a to 22i.

The temperature controller 32 includes the current detector 33, the temperature detector 34, the storage 110, FF calculation controller 111, the monitor controller 112, the automatic parameter setter 113, the proportional integral derivative (PID) calculation controller 114, the D/A converter 115, and the thermo-controller 116.

The current detector 33 detects the drive current on the basis of the electric digital signal outputted from the drive implementer 100. The storage 110 stores the data concerning a target temperature of the optical switches 22a to 22i by the thermo-control, the temperature-threshold for determining the allowable range around the target temperature, and the controlled parameters for every optical switches 22a to 22i necessary for the feedforward control on the basis of the detected results by the current detector.

According to the result detected by the current detector 33, the FF calculation controller 111 determines the controlled variable applied to the feedforward control on the basis of the controlled parameters. The controlled variable is also referred to as control variable or the amount of control, for example such as the amount of feedback control.

The monitor controller 112 controls the automatic parameter setter 113 according to the target temperature and the temperature-threshold which are stored in the storage 110 and the temperature of the optical switches 22a to 22i measured by the temperature detector 34.

The automatic parameter setter 113 receives the information from the temperature detector 34 and the monitor controller 112 and thereby determines the controlled parameters used in performing the feedback and the feedforward controls. The PID calculation controller 114 determines the controlled variable for the feedback control on the basis of the controlled parameters determined by the automatic parameter setter 113.

The D/A convertor 115 converts the electric digital signal corresponding to the controlled variable determine by the PID calculation controller 114 into the electric analog signal and also converts the electric digital signal corresponding to the controlled variable determined by FF calculation controller 111 into the electric analog signal.

The thermo-controller 116 supplies the electric analog signals converted by the D/A convertor 115 to the thermo-electro cooling element 24 in which the electric analog signals serve as feedback control signal or feedforward control signal. Since the thermo-electro cooling element 24 includes functions as Peltier effect, the optical switches 22a to 22i are cooled by the heat absorption of the Peltier effect due to the current according to the electric analog signal. The element table 120 serves as a base on which the optical switch 22 and the thermistor 23 are fixed.

As described above, the PID calculation controller 114 serves as a controller for the feedback controller and the FF calculation controller 111 and the PID calculation controller 114 serve as a feedforward controller.

The temperature detector 34 includes the A/D convertor 117 and the measured signal receiver 118. The A/D convertor 117 converts the electric analog signal corresponding to the resistance value of the thermistor 23 into the electric digital signal and sends the electric digital signal to the measured signal receiver 118. That is, the measured signal receiver 118 receives the data in a digital form relating or corresponding to the temperature of the optical switch 22. It is also possible to configure the temperature detector 34 without the A/D convertor 117.

The communication apparatus 1 has two operation modes, one is "a normal mode" and the other is "an adjusting mode." In the normal mode, the apparatus 1 transfers the optical signals. In the adjusting mode, which will be described later in detail, the controlled parameters used in the feedforward control is determined in the apparatus 1.

Figure 7:
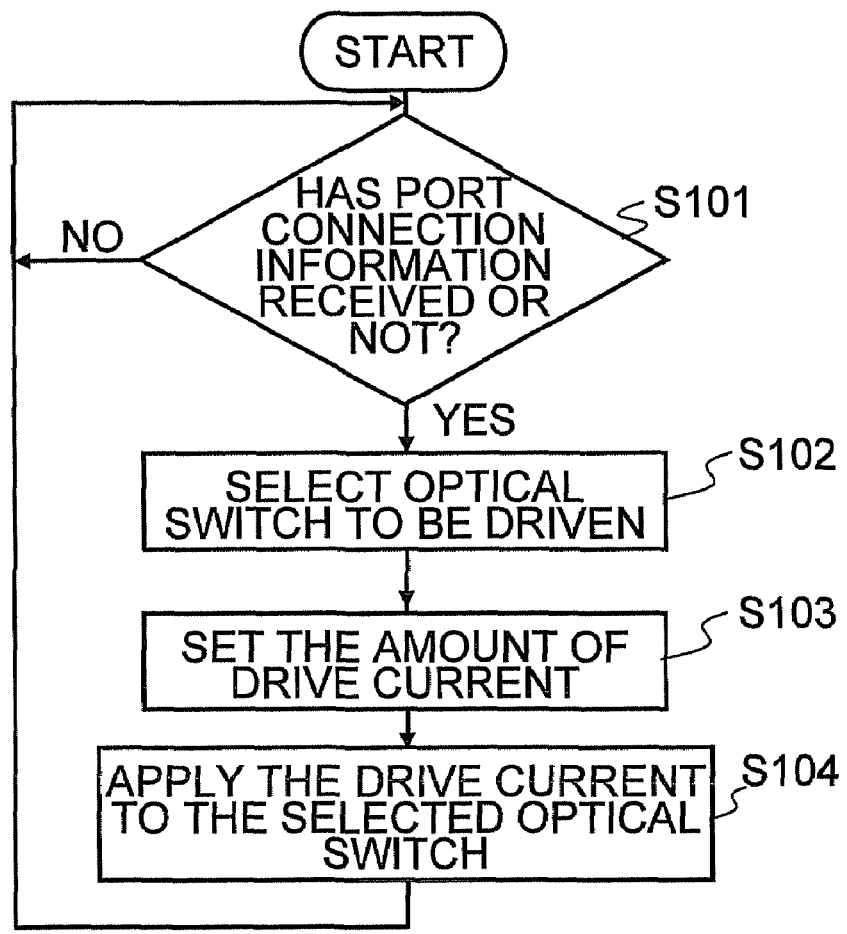
FIG. 7 illustrates an example of operation charts for the drive controller.
Figure 8:
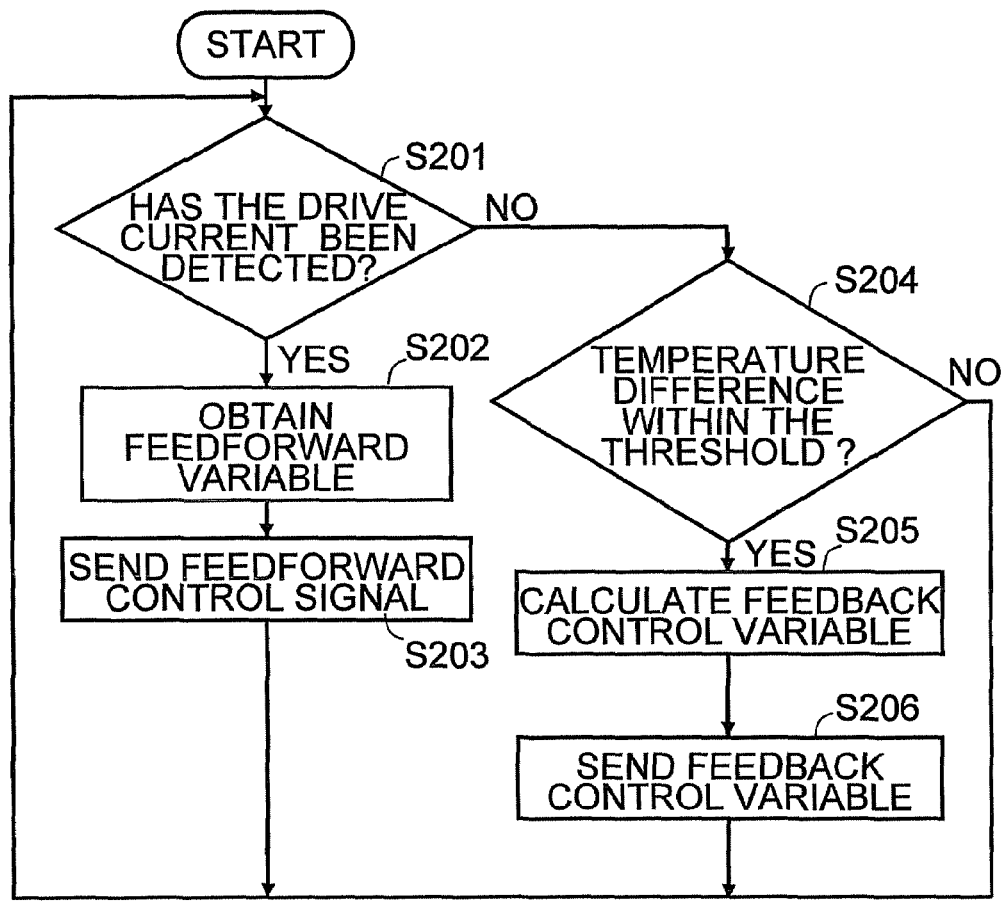
FIG. 8 illustrates an example of operation charts for the thermo-controller.

One of operations performed by the apparatus 1 is described referring to FIGS. 7 and 8, which is executed in the drive controller 31 and temperature controller 32. FIG. 7 is an example of an operation chart performed by the drive controller 31 when the communication apparatus 1 performs an operation regarding the thermo-control of the optical switch 22 in the normal mode, while the apparatus 1, of course, performs many other operations.

In FIG. 7, the drive controller 31 starts the operation and determines whether the port connection information has been received or not (S101). The port connection information has been received (YES in S101), then the drive controller 31 selects one or more to be driven out of the optical switches 22a to 22i on the basis of the port connection information (S102).

Next, the drive controller 31 sets the amount of drive current (S103) and applies the drive current to the selected optical switch 22 (S104), where the alphabetical index identifying the selected optical switch such as "a" of 22a is omitted for clarification. When the operation in S104 is performed or the port connection information has not received in S101 (NO in S101), the drive controller returns the operation to that of S101.

FIG. 8 is an example of operation chart performed by the temperature controller 32. The temperature controller 32 starts the operation and determines whether generation of the drive current has been detected or not (S201). The determination in S201 is determining whether the current detector 33 detects the electric digital signal outputted to the D/A convertor 101 from the drive implementer 100. In the determination in S201, the drive current is detected (YES in S201), the temperature controller 32 obtains the information regarding the controlled variable for the feedforward control for the optical switch 22 selected in S102 (S202). Thereby the temperature controller 32 sends the feedforward control signal to the thermo-electro cooling element 24 corresponding to the optical switch 22 selected in S102 (S203).

In the operation in S201, the drive current has not been detected (NO in S201), the monitor controller 112 determines whether the difference between the temperature measured by the thermistor 23 and the target temperature of the optical switch module 21 is within the rage of the temperature threshold (S204). When the difference is out of the range (YES in S204), PID calculation controller 114 calculates the feedback control variable (S205). Then the temperature controller 32 sends the feedback control variable to the thermo-electro cooling element 24 (S206).

After the operations in S203 or S206 or when the difference not without the range of temperature threshold (NO in S204), the temperature controller 32 performs the operation in S201.

Next, the adjusting mode of the communication apparatus 1 is explained in detail with FIGS. 9 to 16. The adjusting mode is the mode in which the parameters applied to every optical switch 22 are automatically determined, where the parameters are the proportional, integral, and differential coefficients on which the feedforward control is performed as a PID control.

Figure 9:
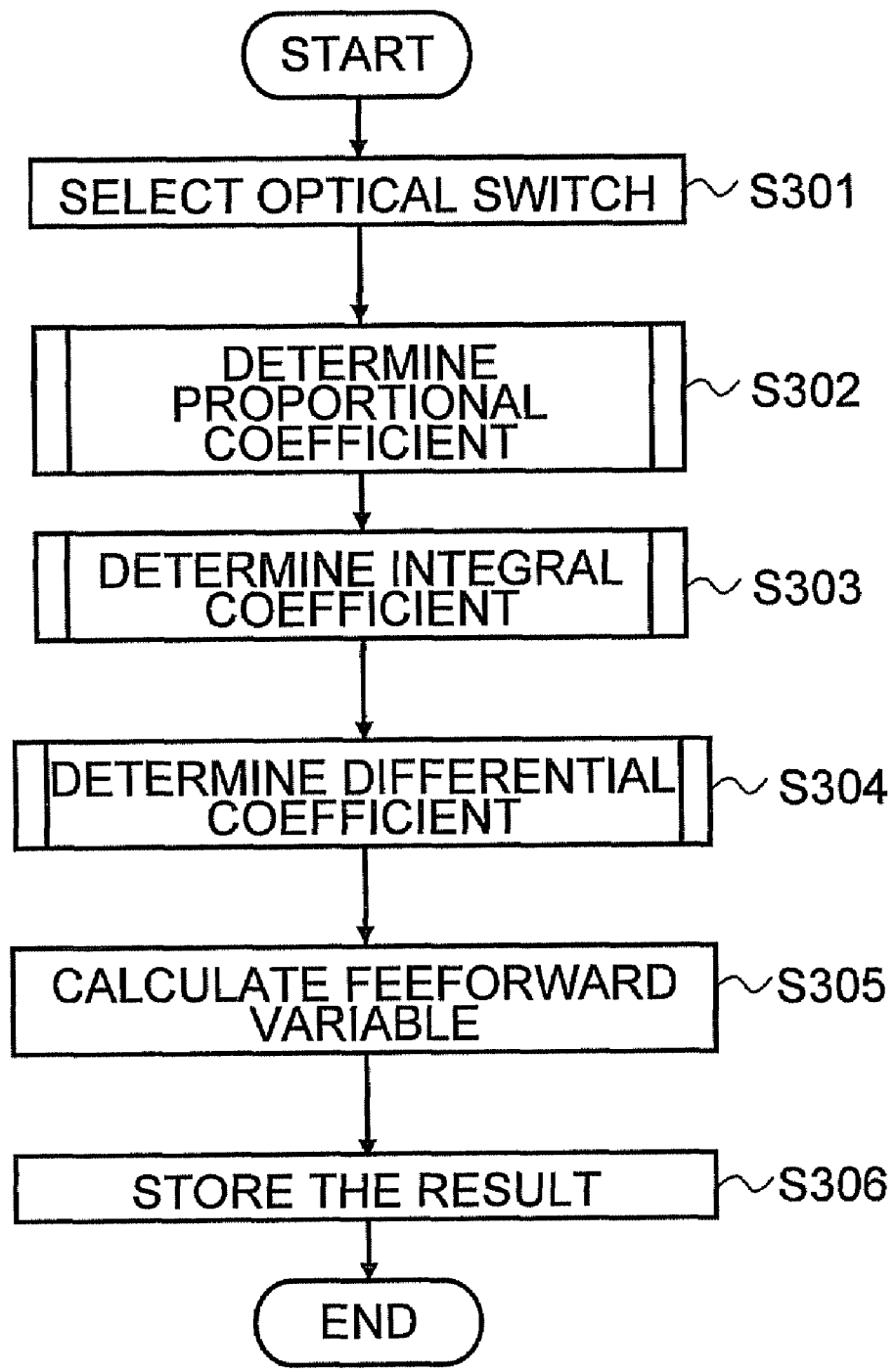
FIG. 9 illustrates an example of operation charts for the parameter implementer.

FIG. 9 is a diagram depicting an example of operations performed by the automatic parameter setter 113, where the diagram illustrates the operations related to the adjusting mode.

As illustrated in FIG. 9, the automatic parameter setter 113 starts the operation and selects one of the optical switches 22a to 22i to implement the control parameters (S301) and performs the operation for determining a proportional coefficient as one of the control parameters which will be described later. Then the automatic parameter setter 113 performs the operations for determining an integral coefficient and a differential coefficient (S303 and S304), each as one of the control parameters, which also will be described later in detail.

After the operations for determining each parameters in S302 to S303, the automatic parameter setter 113 determines the feedforward control variable (S305). Then the automatic parameter setter 113 stores into the storage 110 the calculated feedforward control variable associated with the optical switch 22 selected in S301 (S306) and closes a series of the operations.

Figure 10:
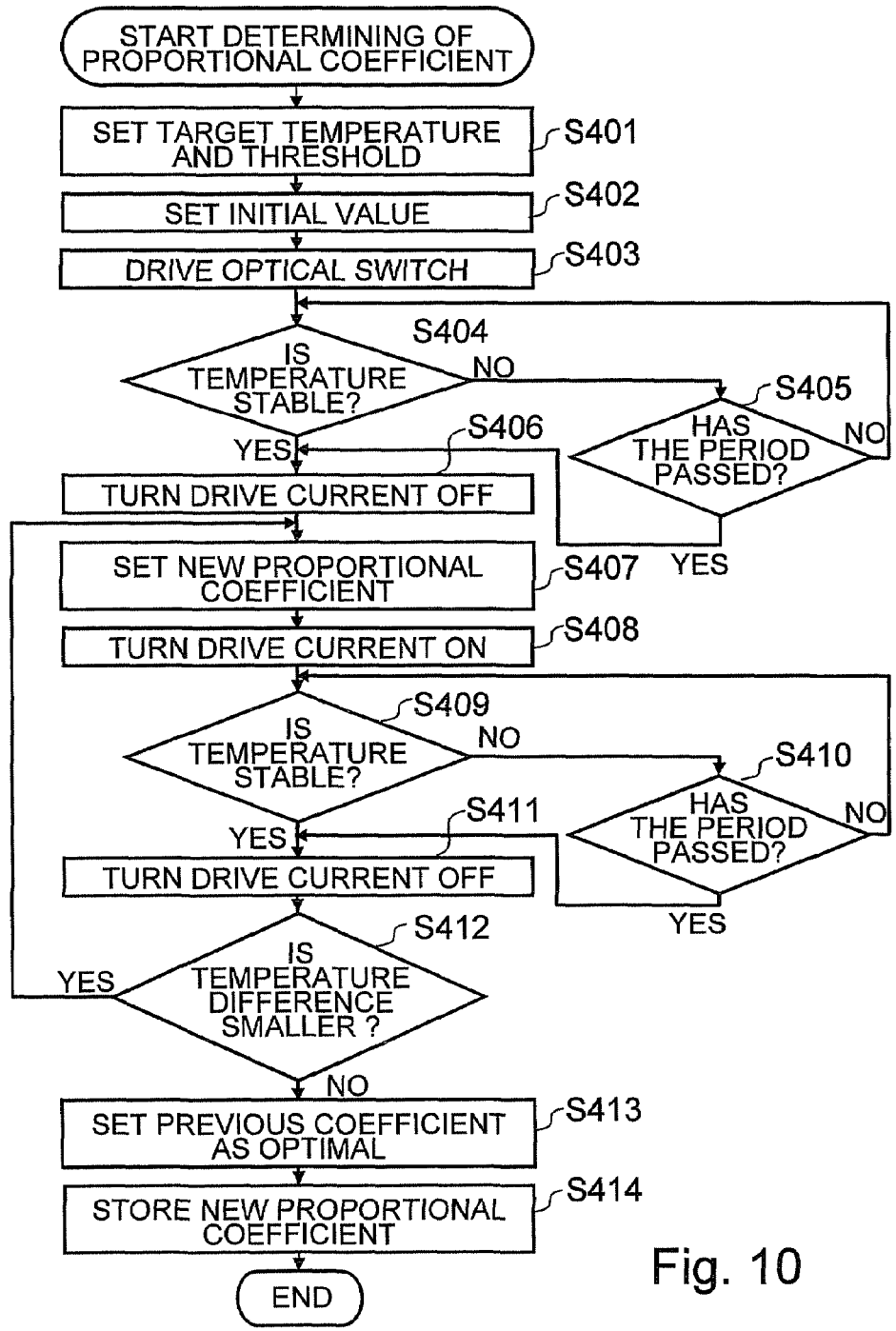
FIG. 10 illustrates an example of operation charts for the determination process of a proportionality coefficient.
Figure 11:
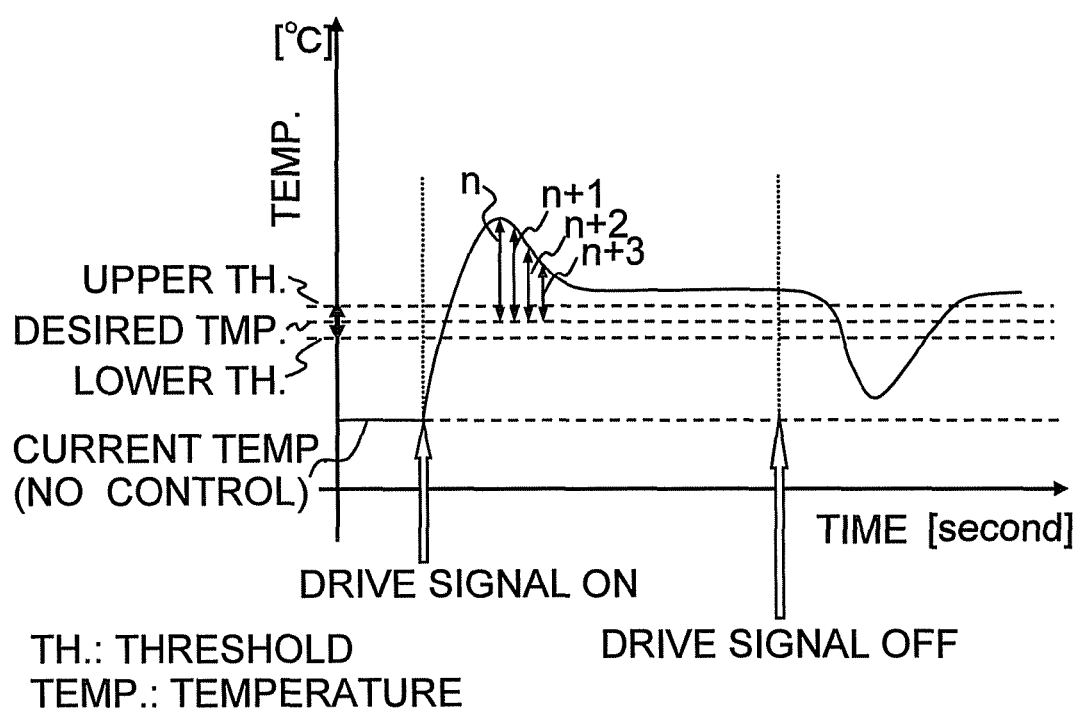
FIG. 11 is a diagram illustrating a resultant measured temperature variation according the optical switch under the determination process of a proportionality coefficient.

FIG. 10 is an example of the operation chart for the proportional coefficient determining operation and FIG. 11 is a diagram illustrating the variation in temperature of the optical switch 22 controlled by the proportional coefficient determining operation. As depicted in FIG. 10, the automatic parameter setter 113 starts the operation for obtaining to set the data of the target temperature and the temperature threshold stored in the storage 110 (S401), and set the initial value of the proportional coefficient which is determined previously and stored in a predetermined area in the storage 110 (S402). Then the automatic parameter setter 113 turns on the drive current for drive the optical switch 22 (S403).

Next, the automatic parameter setter 113 determines whether the temperature of the optical switch 22 is stable or not (S404). The determination of the stability in temperature is determined according to the resultant temperature monitored by the monitor controller 112 as illustrated in FIG. 11. FIG. 11 illustrates that the measured temperature of the optical switch 22 and the target temperature. The temperature difference is monitored periodically as depicted by the arrows n to n+10, where it is determined that the temperature of the optical switch 22 is stable if the temperature differences n to n+10 are constant or within a predetermined range. In S404, when the temperature of the optical switch 22 is not stable (SNO in S404), the operation of the automatic parameter setter 113 moves to S405.

In S405, the automatic parameter setter 113 determines that a predetermined constant time has passed or not. In this operation, when the predetermined constant time has not passed (NO in S405), the operation of the automatic parameter setter 113 moves to S404.

When it is determined that the temperature of the optical switch 22 is stable (YES in S404) or the predetermined constant time has passed (YES in S405), the automatic parameter setter 113 turns the drive current off (S406).

Next the automatic parameter setter 113 sets the previous proportional coefficient+α as new one (S407) and turns the drive current on again (S408). Subsequently the automatic parameter setter 113 performs the operations same to them in S404 to S406 (S409 to S411).

In S412, the automatic parameter setter 113 determines whether the temperature difference between the target temperature and the optical switch 22 is smaller than the previous temperature difference. In this operation, the temperature difference is smaller than the previous one (YES in S412), the automatic parameter setter 113 moves the operation to S407 and performs again the measurement of the temperature.

In S412, when the temperature difference is same or larger than the previous temperature difference (NO in S412), the automatic parameter setter 113 determines the proportional coefficient used in the previous measurement as the optimal proportional coefficient (S413). Then the automatic parameter setter 113 associates the proportional coefficient, which determined as the optimal one, with the optical switch selected 22 in S301 and stores them in the storage 110 (S414). Performing the operation in S414, the automatic parameter setter 113 closes the operations for the proportional coefficient determining operation. As described above, the proportional coefficient is determined on the basis of the temperature difference between the stable temperature and the target temperature of the optical switch 22 on driving by the application of the drive current.

Figure 12:
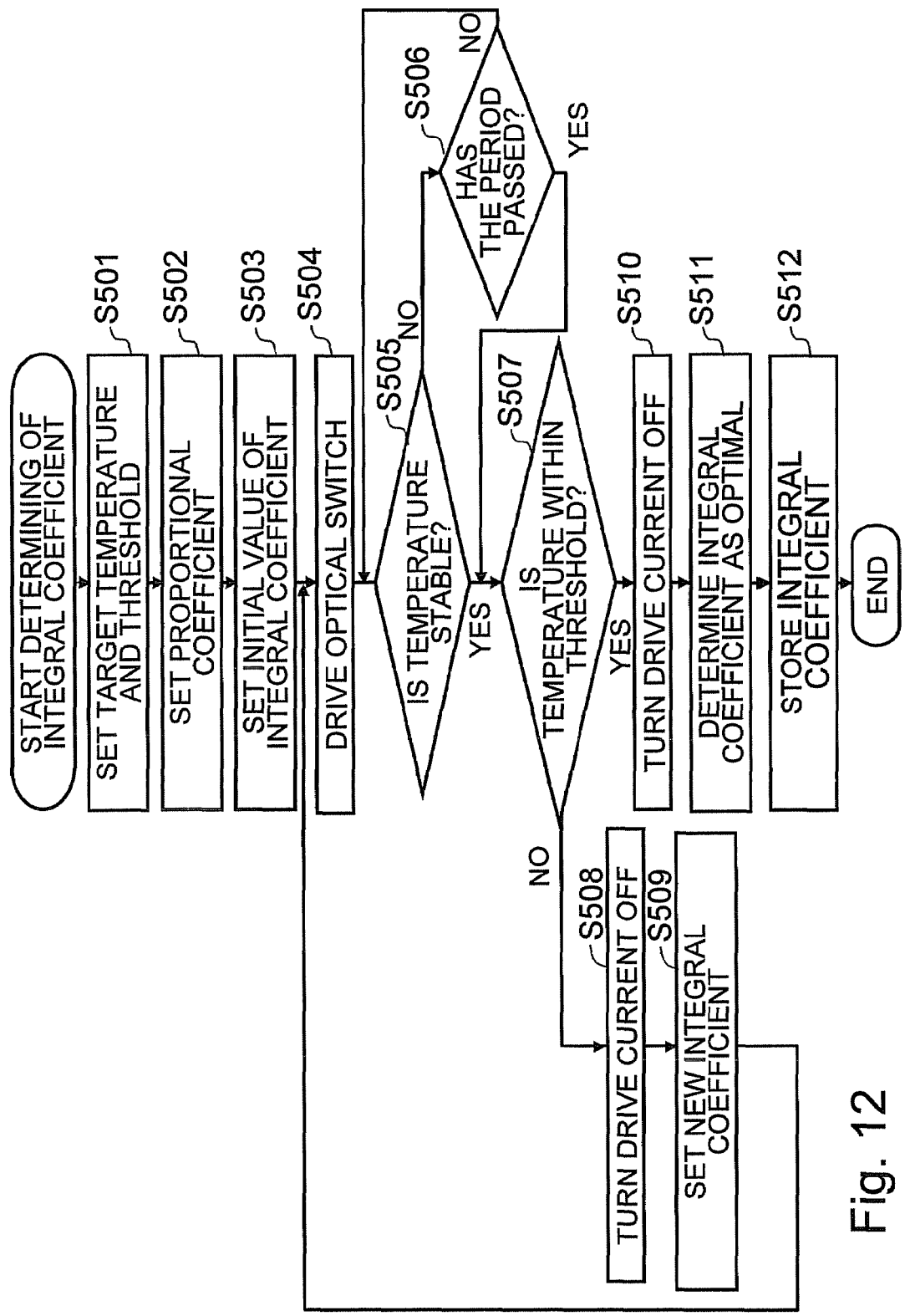
FIG. 12 illustrates an example of operation charts for the determination process of an integral coefficient.
Figure 13:
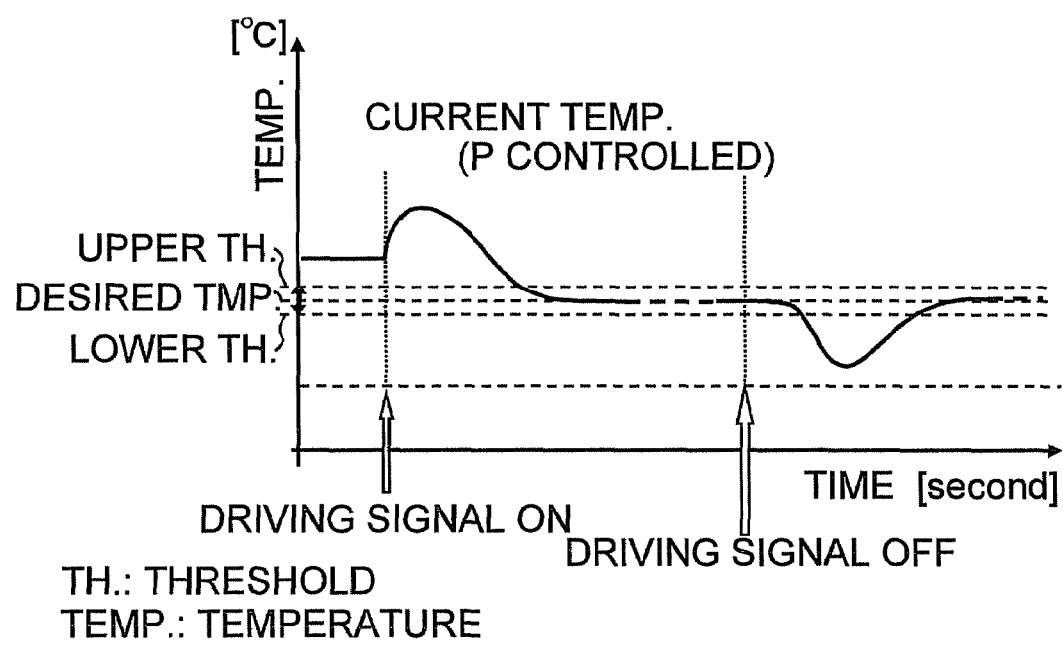
FIG. 13 is a diagram illustrating a resultant measured temperature variation according the optical switch under the determination process of a proportionality coefficient.

FIG. 12 is an example of a operation chart of the operation for the determination of an integral coefficient and FIG. 13 is a diagram illustrating the temperature variation of the optical switch 22 under the operation for the determination of the integral coefficient. As depicted in FIG. 12, the automatic parameter setter 113 starts the operation to obtain the information of the target temperature and the temperature threshold stored in the storage 110, and then set them as the information set (S501). The parameter implementer also sets the proportional coefficient determined previously (S502). Further the automatic parameter setter 113 sets a predetermined value (initial value) as the integral coefficient (S503), where the predetermine value is stored in a predetermined area of the storage 110. Then the automatic parameter setter 113 turns on the drive current according to the information set described above (S504).

Next, the automatic parameter setter 113 determines whether the temperature of the optical switch 22 is stable or not (S505). In this operation, when the temperature of the optical switch 22 is not stable (NO in S505), the automatic parameter setter 113 moves the operation to S506.

In S506, the automatic parameter setter 113 determines whether the predetermined period has passed after turning the drive current on. When the predetermine period has not passed (NO in S506), the automatic parameter setter 113 moves the operation to S505.

When the temperature of the optical switch 22 is determine to be stable (YES in S505) or the predetermine period is determined to have passed (YES in S506), the automatic parameter setter 113 moves the operation to S507.

In S507, the automatic parameter setter 113 determines whether the temperature of the optical switch 22 remains in the range of the temperature threshold which is illustrated in FIG. 13. FIG. 13 illustrates that the temperature of the optical switch 22 is controlled to fall in the range of the temperature threshold by the PI control (the proportional integral control), where the range is a range between the upper and lower thresholds.

In this operation, when the temperature of the optical switch 22 is out of the range of temperature threshold (SNO in S507), the automatic parameter setter 113 turns the drive current off (S508). Then the automatic parameter setter 113 sets the previous integral coefficient+α as the current integral coefficient (S509) and moves the operation to S504. The operation described above of the automatic parameter setter 113 updates the integral coefficient and measure the temperature of the optical switch till the temperature of the optical switch 22 falls within the range of temperature threshold.

When the temperature of the optical switch 22 is determined to be within the temperature threshold (YES in S507), the automatic parameter setter 113 turns off the drive current (S510). Then the automatic parameter setter 113 determines the current integral coefficient as the optimal integral coefficient (S511) and associates the data of the current integral coefficient with the optical switch 22 selected in S301 and then stores the data in the storage 110 (S512). The automatic parameter setter 113 closes the operation after the operation of S512.

As described above, the integral coefficient is determined according to the proportional coefficient in the operation for proportional coefficient determination and the difference between the predetermined temperature and the stable temperature in which the optical switch 22 driven by the drive current falls.

Figure 14:
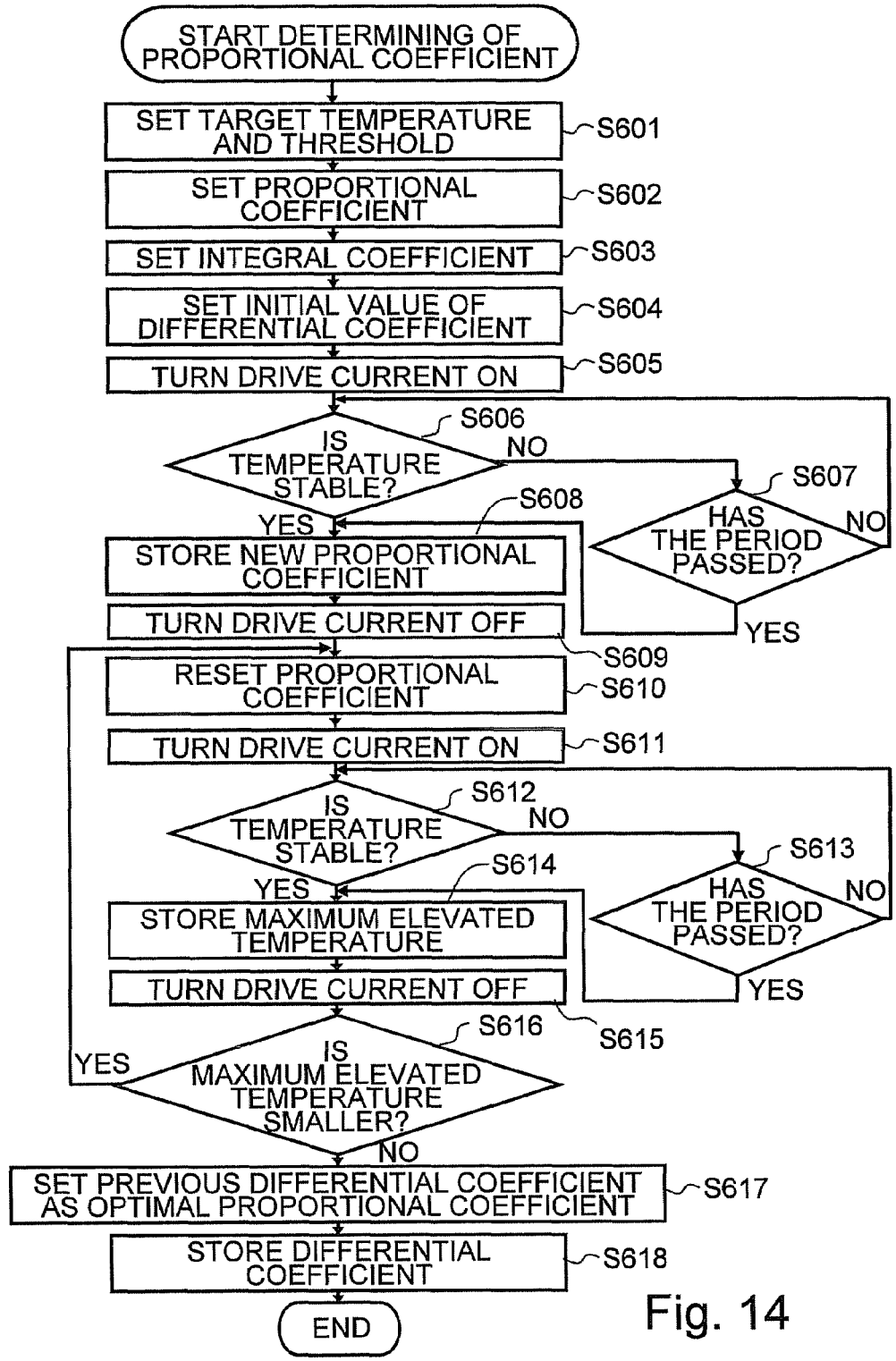
FIG. 14 illustrates an example of operation charts for the determination process of a differential coefficient.
Figure 15:
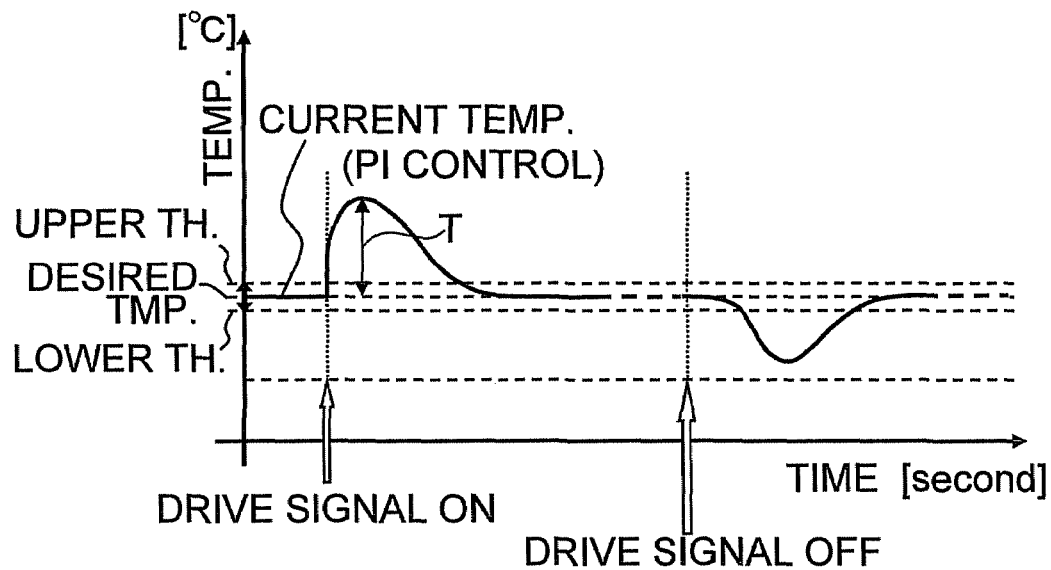
FIG. 15 is a diagram illustrating a resultant measured temperature variation according the optical switch under the determination process of a differential coefficient.
Figure 16:
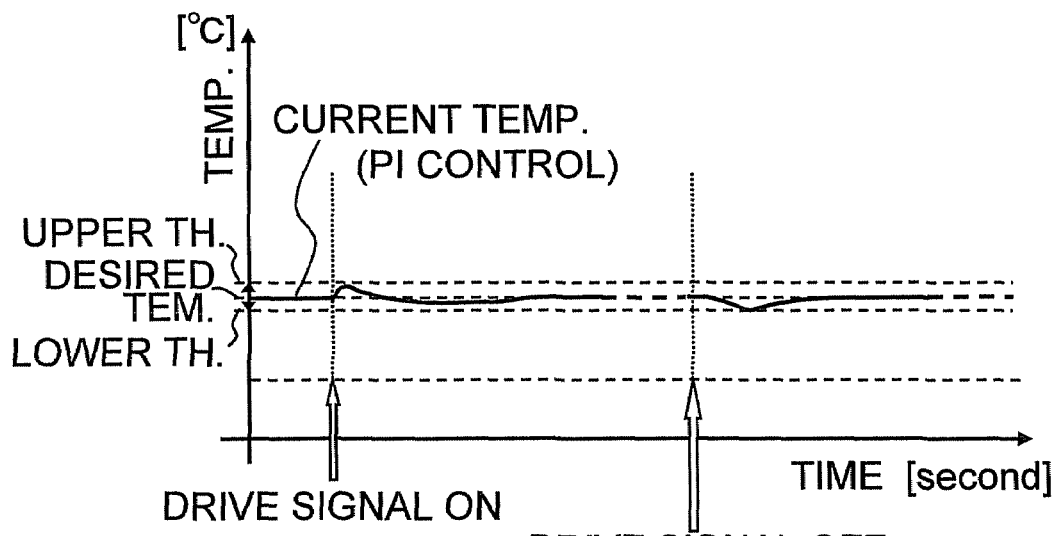
FIG. 16 is a diagram illustrating a resultant measured temperature variation according the optical switch under the feedforward control.

The operation for differential coefficient determination will be explained next referring to FIGS. 14 and 15. FIG. 14 illustrates an example of the operation chart for the differential coefficient determination and FIG. 15 illustrates a diagram depicting the resultant temperature variation of the optical switch 22 under the operation for the differential coefficient determination. As illustrated in FIG. 14, the automatic parameter setter 113 starts the operation for differential coefficient determination and obtains the data of the target temperature and the temperature threshold of the optical switch 22 from the storage 110 to set them (S601). And then the automatic parameter setter 113 sets the proportional coefficient obtained in the operation for the proportional coefficient determination (S602) and the integral coefficient in the operation for the integral proportional determination (S603).

Further the automatic parameter setter 113 sets an predetermined value (initial value), which is stored an area of the storage 110, as a differential coefficient (S604) and then turns the drive current on according the data set above (S605).

Subsequently the automatic parameter setter 113 determines whether the temperature of the optical switch 22 becomes stable or not (S606). When the temperature of the optical switch 22 is not stable (NO in S606), the automatic parameter setter 113 moves the operation to S607.

In S607, the automatic parameter setter 113 determines whether the predetermined period has passed after turning the drive current on. When the predetermined period has not passed (NO in S607), the automatic parameter setter 113 moves the operation to S606.

When the temperature of the optical switch 22 is determined as being stable (YES in S606) or the predetermined period is determined to have passed (YES in S607), the automatic parameter setter 113 stores the data of the maximum elevated temperature value T which is the difference between the maximum temperature of the optical switch 22 and the stable temperature of the optical switch 22 before applying the drive current to the optical switch 22 (S608). As illustrating in FIG. 15, the maximum elevated temperature value T is the difference between the maximum temperature of the optical switch 22 measured by the temperature detector 34 and the stable temperature of the optical switch 22 before turning the drive current on. The automatic parameter setter 113 stores the data of the maximum elevated value T and then turns off the drive current (S609).

Subsequently the automatic parameter setter 113 sets the previously set differential coefficient+α as the current differential coefficient (S610) and then turns on the driving power source (S611). The automatic parameter setter 113 performs again the operations same to the operations in S606 to S609 (S612 to S612).

Next, the automatic parameter setter 113 determines whether the maximum elevated temperature value T currently measured is smaller than that previously measured (S616). When the value T currently measured is smaller than that previously measured (YES in S616), the automatic parameter setter 113 moves the operation to the operation in S610 and the measurement is again performed.

In S616, the value T currently measured is equal to or larger than the value T previously measured (NO in S616), the automatic parameter setter 113 determines the differential coefficient previously set as the optimal one (S617). Then the automatic parameter setter 113 associates the data of the differential coefficient previously set with the optical switch 22 and stores the data in the storage 110 (S618). The automatic parameter setter 113 closes the operation for the differential coefficient determination with the completion of the operation of S618.

As described above, the differential coefficient is determined according to the proportional coefficient determined in the operation for the proportional coefficient determination, the integral coefficient determined in the operation for the integral coefficient determination, and the maximum elevated temperature value T.

The optical transmission apparatus 1 calculates the feedforward control variable on the basis of the each parameter derived in the manner described above and then the feedforward variable is outputted to the thermo-electro cooling element 24. By this operation, the feedforward control is performed with an appropriate or optimal control variable just after applying the drive current to the optical switch 22. Therefore the increased temperature of the optical switch 22 may be kept within the range of the temperature threshold.

As explained above, the optical communication apparatus according the first embodiment may be output sufficiently stable optical signals by controlling appropriately the temperature of optical switch 22 with the feedback and the feedforward controls.

Additionally, since the communication apparatus 1 also includes the adjusting mode, the communication apparatus 1 may determines for each of the optical switches 22a to 22i the optimal control parameters individually which are used the feedforward control.

The Second Embodiment

The communication apparatus according to the first embodiment performs the stabilization of the level of the optical output of the optical switch 22 with the feedback control on the basis of the temperature of the optical switch 22 and the feedforward control on the basis of the generation of the drive current. However it takes a time to conduct the heat of cooling generated by the thermo-electro cooling element 24 to the optical switch 22. For more appropriate output stabilization of the optical signals, it is preferable to compensate the output drop which will occur during the period for the heat of cooling to conduct to the optical switch 22.

The communication apparatus 1 according to second embodiment includes a function for controlling the amplitude of the optical signals on the generation of the drive, thereby a more appropriate stabilization of the level optical output may be performed. The communication apparatus 1 according to the second embodiment will be explained with drawings and the each element same or similar to that in the first embodiment has the same reference numeral and the explanation for the element will be omitted.

Figure 17:
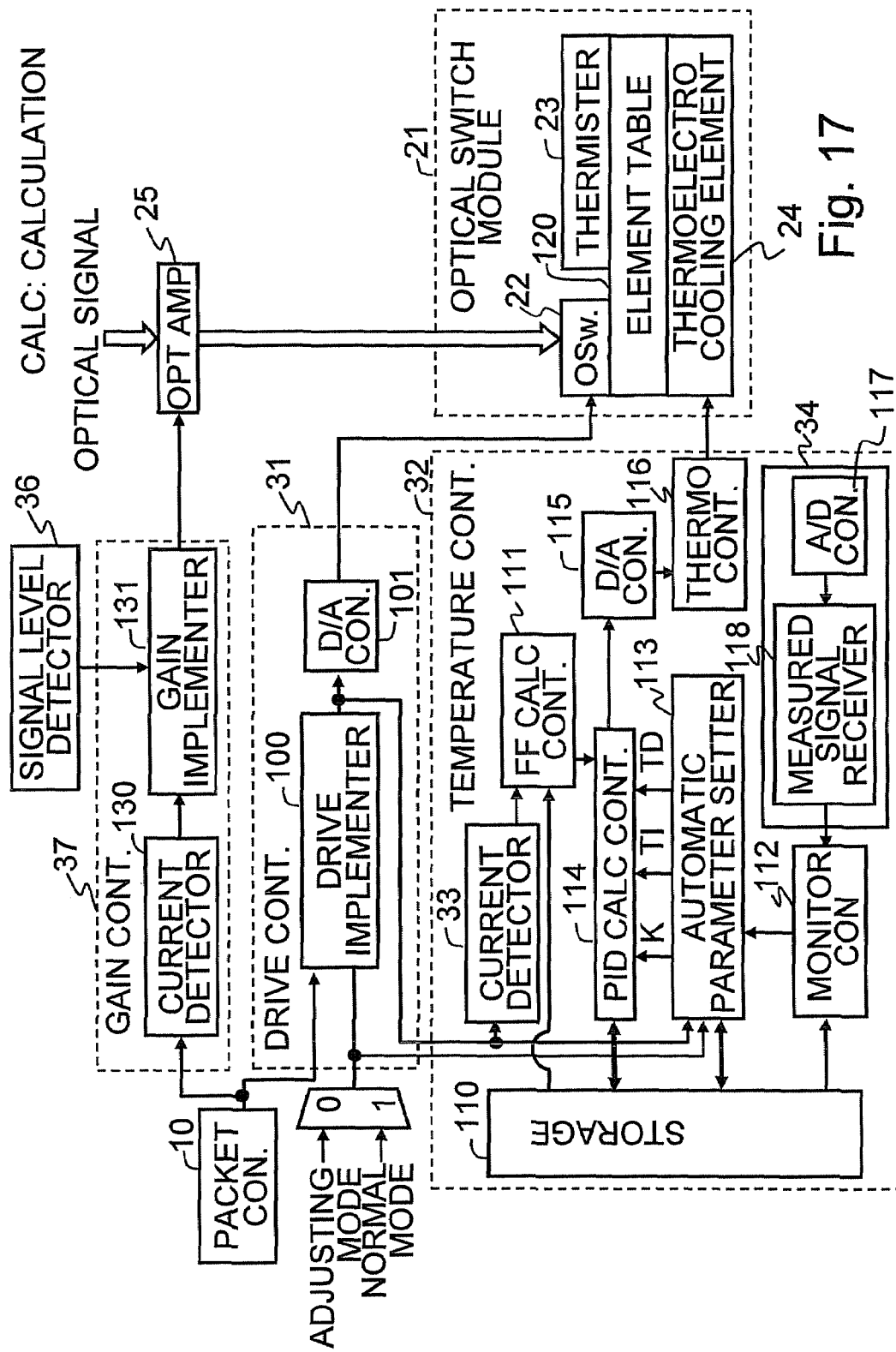
FIG. 17 is a block diagram illustrating the gain controller, the drive controller, the thermo-controller, and the optical module according to the second embodiment.

The communication apparatus 1 depicted in FIG. 17 also includes similar configuration of the communication apparatus 1 according to the first embodiment illustrated in FIG. 5, while the communication apparatus 1 according to the second embodiment further includes gain controller 37. FIG. 17 is the block diagram illustrating the gain controller 37, the drive controller 31, the thermo-control unit 32, and the optical switch module 21, where the gain controller 37 includes the current detector 130 and the gain implementer 131. The current detector 130 receives the data of the port connection information form the optical packet convertor 10.

The gain implementer 131 sends to the optical amplifier 25 the control signal for determining the amplification factor for amplifying the optical signal inputted in the optical amplifier 25, where the control signal is determined by the levels of the input and output optical signals. The gain implementer 131 obtains the data of the port connection information from the current detector 130, thereby specifies which of the optical amplifiers 25 will output the optical signal, and sends the control signal to the optical amplifier 25 specified by the port connection information.

Thus, the current detector 130 detects the generation of the drive current by obtaining the port connection information. In spite of the resultant detection by the signal level detector 36, the gain implementer 37 sends the control signal to for optical amplifier 25 to amplify the optical signal during a predetermined period when the current detector 130 detects the generation of the drive current.

Figure 18:
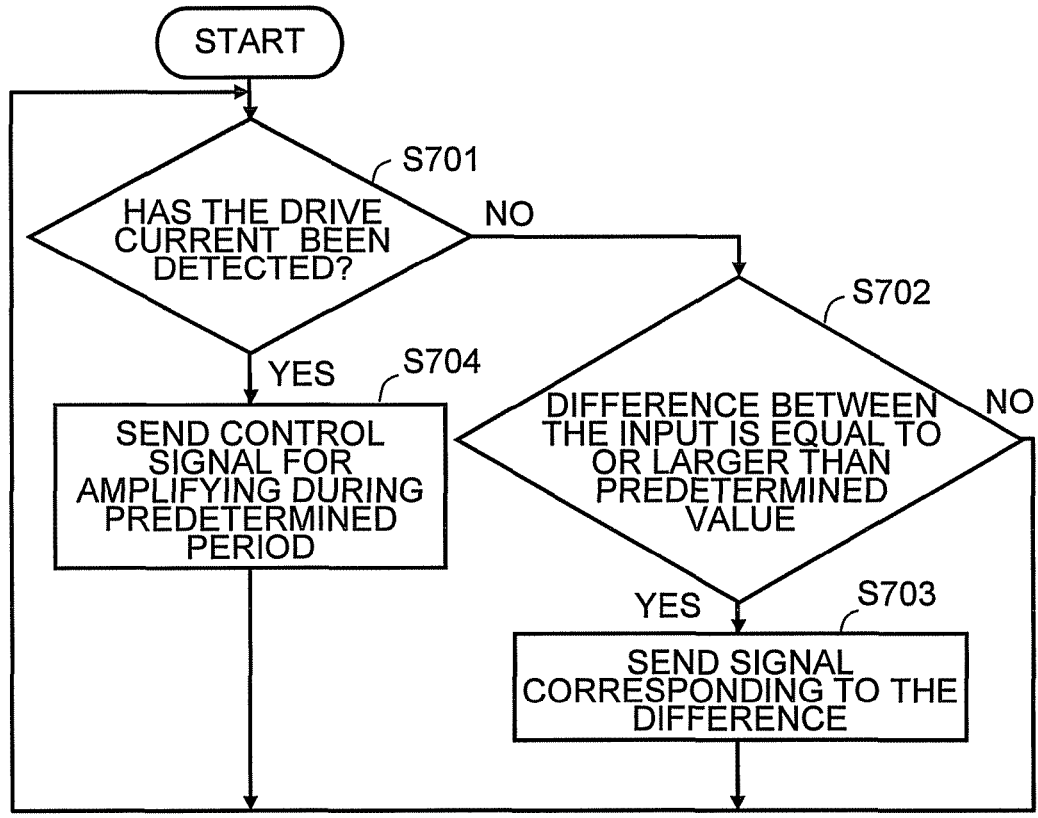
FIG. 18 is an example of operation charts performed in the gain controller.

Referring to FIG. 18 illustrating an example of the operation chart of the gain controller 37, the detail of the operation of the gain controller 37 will be explained. The gain controller 37 starts the operation and determines whether the generation of the drive current is detected or not (S701). The determination for the generation of the drive current is performed by whether the current detector 130 obtains the data of the port connection information or not. When the drive current is not detected (NO in S701), the gain controller 37 moves the operation to S702.

In S702, the gain controller 37 determines whether the difference value between levels of the input and output optical signals is equal to or larger than a predetermined value. When the difference value is equal to or larger than the predetermined value (YES in S702), the gain controller 37 sends the control signal corresponding to the difference value to the optical amplifier 25 (S703).

In S701, when the generation of the drive current is detected (YES in S701), the gain controller 37 sends the control signal to for optical amplifier 25 to amplify the optical signal during a predetermined period (S704), where the predetermined period is a time necessary for the cooling heat generated by the thermo-electro element 24 to conduct to the optical switch 22. Further the amplification factor is decided so as to compensate the amount dropped of the input signal value during at injecting the drive current to at starting the feedforward control performed by the thermo-control unit 32.

As explained above, the communication apparatus 1 according to the second embodiment outputs a optical signal of lager value than that in the stationary operation while the cooling heat generated by the thermo-electro element 24 conducts to the optical switch 22 after the injection of the drive current. Owing to this operation, it may be prevented that the drop in the level of optical output occurs immediately after application of the drive current alone with use of the feedforward control. Accordingly, the communication apparatus 1 according to the second embodiment may output more stably the optical signal because of the more appropriate control of the temperature of the optical switch 22.

The Third Embodiment

The first embodiment of the communication apparatus 1 intends to improve the stabilization of the optical output level through the controlling the temperature of the optical switch 22 by the feedback control on the basis of the temperature of the optical switch 22 and the feedforward control on the basis of the use of the generation of the drive current. The second embodiment of the communication apparatus 1 intends to improve the more sufficient stabilization of the optical output level by controlling the amplifying factor for the optical signal immediately after the drive current application in addition to the feedforward control. However an abrupt change in the drive current to the optical switch 22 or in the current for amplifying the optical signal is liable to abruptly change in an the current applied to the optical switch module 21. Since the abrupt change in the amount of current is liable to causes the abrupt change in the temperature of the optical switch 22, it is difficult to keep the temperature of the optical switch 22 within the predetermined temperature range. Therefore it is preferable to handling these abrupt change in current value for the more improved controlling the temperature of the optical switch 22 and more stable output of the optical output.

For these improvements, the third embodiment of the communication embodiment 1 intends to dynamically change the target temperature for the feedback control to control more adequately the optical switch 22 and thereby stabilize the output of the optical signal in addition to the feedforward control explained in the first embodiment. The problem will be explained for each system without dynamic change of the target temperature.

[Problem when Target Temperature is not Dynamically Changed]

Figure 19A:
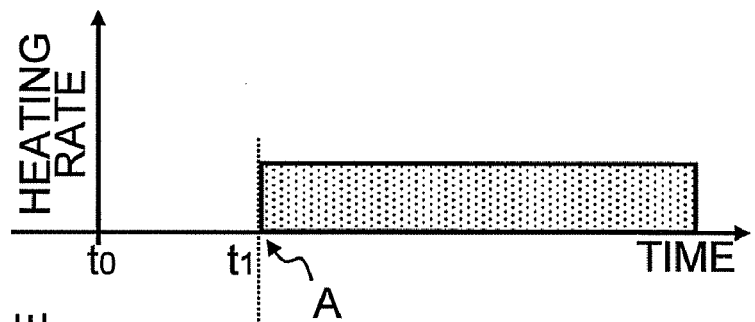
FIGS. 19A and 19B illustrate a problem to be solved in a system in which thermo-control is not performed.
Figure 19B:
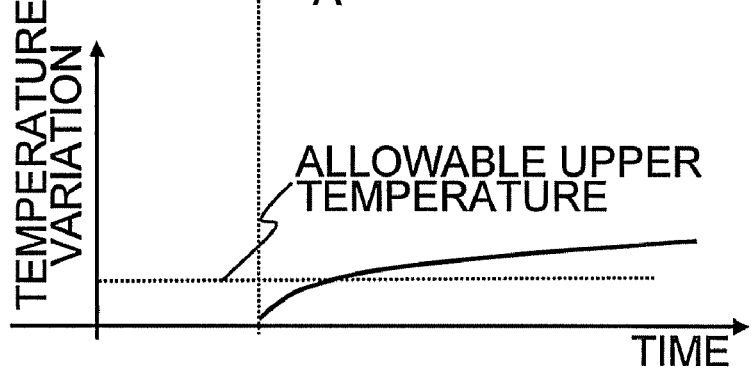

Problems when the target temperature is not dynamically changed will be described for individual systems with reference to FIGS. 19A to 21C. FIGS. 19A to 19C illustrate a problem of a system that does not perform temperature control, FIGS. 20A to 20C illustrate a problem of a system that performs only temperature control based on the feedback control, and FIGS. 21A to 21C illustrate a problem of a system that performs the feedforward control in conjunction with the feedback control.

As illustrated in FIG. 19A, in the system that does not perform temperature control, when drive of the optical switch 22 and amplification of an optical signal are started at time t1 (as indicated by A), heat generation begins. In response, as illustrated in FIG. 19B, the temperature of the optical switch 22 increases continuously and then exceeds an allowable upper-limit temperature, and thus cannot be maintained in an allowable range.

Figure 20A:
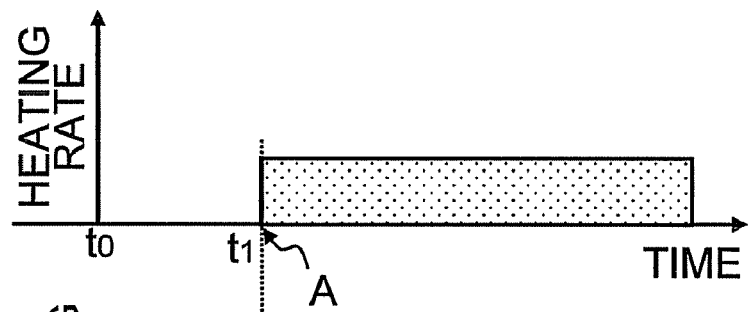
FIGS. 20A to 20C illustrate a problem to be solved in a system in which only feedback control is performed as the thermo-control of the optical switch.
Figure 20B:
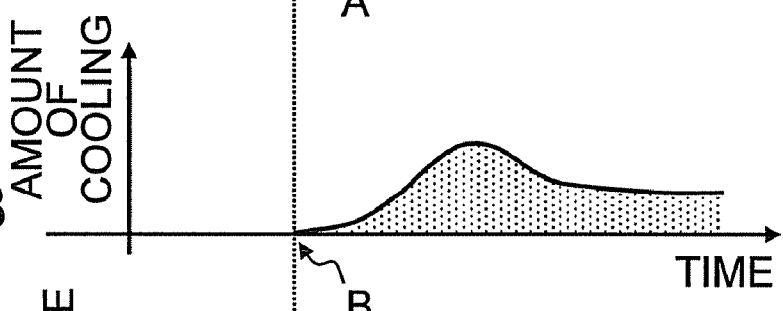
Figure 20C:
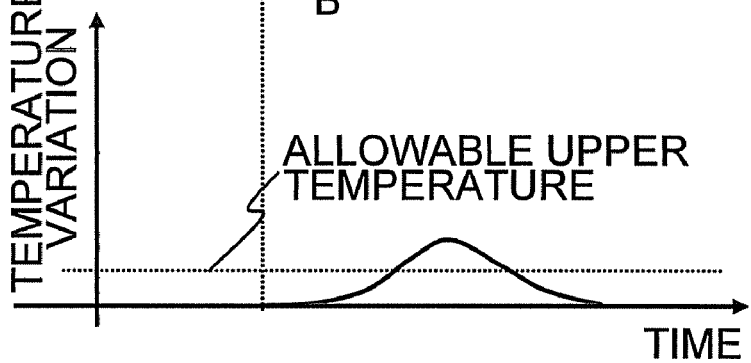

As illustrated in FIG. 20A, in the system that performs only temperature control based on the feedback control, when drive of the optical switch 22 and amplification of an optical signal are started at time t1 (as indicated by A) in the same manner illustrated in FIG. 19A, heat generation begins and the temperature of the optical switch 22 also starts increasing (as indicted by B) as illustrated in 20B. However, since the optical switch 22 is also cooled by functioning of the feedback control, the temperature of the optical switch 22 then converges to a temperature in the allowable range. Nevertheless, when the amount of current flowing to the optical switch module 21 changes sharply, the temperature of the optical switch 22 may exceed the allowable upper-limit temperature, as illustrated in FIG. 20C, and thus cannot be maintained in the allowable range.

As illustrated in FIG. 21A, in the system that performs the feedforward control in conjunction with the feedback control, when drive of the optical switch 22 and amplification of an optical signal are started at time t1 (as indicated by A), heat generation begins and the temperature of the optical switch 22 also starts increasing, in the same manner illustrated in FIGS. 19A and 20A. However, as illustrated in FIG. 21B, temperate control is performed by functioning of the feedback control at a higher rate than that in the case illustrated in FIG. 20B to cool the optical switch element 22, so that the temperature of the optical switch 22 then converges to a temperature in the allowable range.

However, when the amount of current flowing to the optical switch module 21 increases sharply, the temperature of the optical switch 22 may exceed the allowable upper-limit temperature, as illustrated in FIG. 21B, and thus cannot be maintained in the allowable range. In addition, since a delay exists until the optical switch 22 is cooled by the feedforward control, the feedback control during the delay period is also excessively performed. Consequently, as illustrated in FIG. 21C, undershoot may occur (as indicated by B).

The undershoot is due to the structure of the optical switch module 21. As illustrated in FIG. 6, the optical switch module 21 has a structure in which the thermoelectric cooling element 24 cools the optical switch 22 and the element table 120 is provided between the thermoelectric cooling element 24 and the optical switch element 22. The element table 120 is a component that serves as a base for the optical switch 22 and is called a "stem" or "carrier". Since the element table 120 and the optical switch 22 intrinsically have heat capacities, it takes time for the cooling effect of the thermoelectric cooling element 24 to be transmitted to the optical switch element 22. That is, even with feedforward control as that performed by the optical communication apparatus 1 according to the first embodiment and the optical communication apparatus 1 according to the second embodiment, when the amount of current flowing to the optical switch module 21 changes sharply, the temperature of the optical switch 22 cannot necessarily always be maintained in the allowable range.

An approach for increasing the capability of the thermoelectric cooling element 24 is also available. However, if current flowing to the thermoelectric cooling element 24 (e.g., a Peltier element) is excessively increased, the thermoelectric cooling element 24 itself causes thermal runaway, which has an adverse effect. Because of physical limitations of the optical switch module 21 and the apparatus using it, an increase in the capability of the thermoelectric cooling element 24 is limited.

Any of the system that does not perform temperature control, the system that performs only temperature control based on the feedforward control, and the system that performs the feedforward control in conjunction with the feedback control cannot deal with a sharp change in the amount of current. This also affects the performance of the apparatus using the optical switch module 21.

[Overview of Optical Communication Apparatus According to Third Embodiment]

Figure 22:
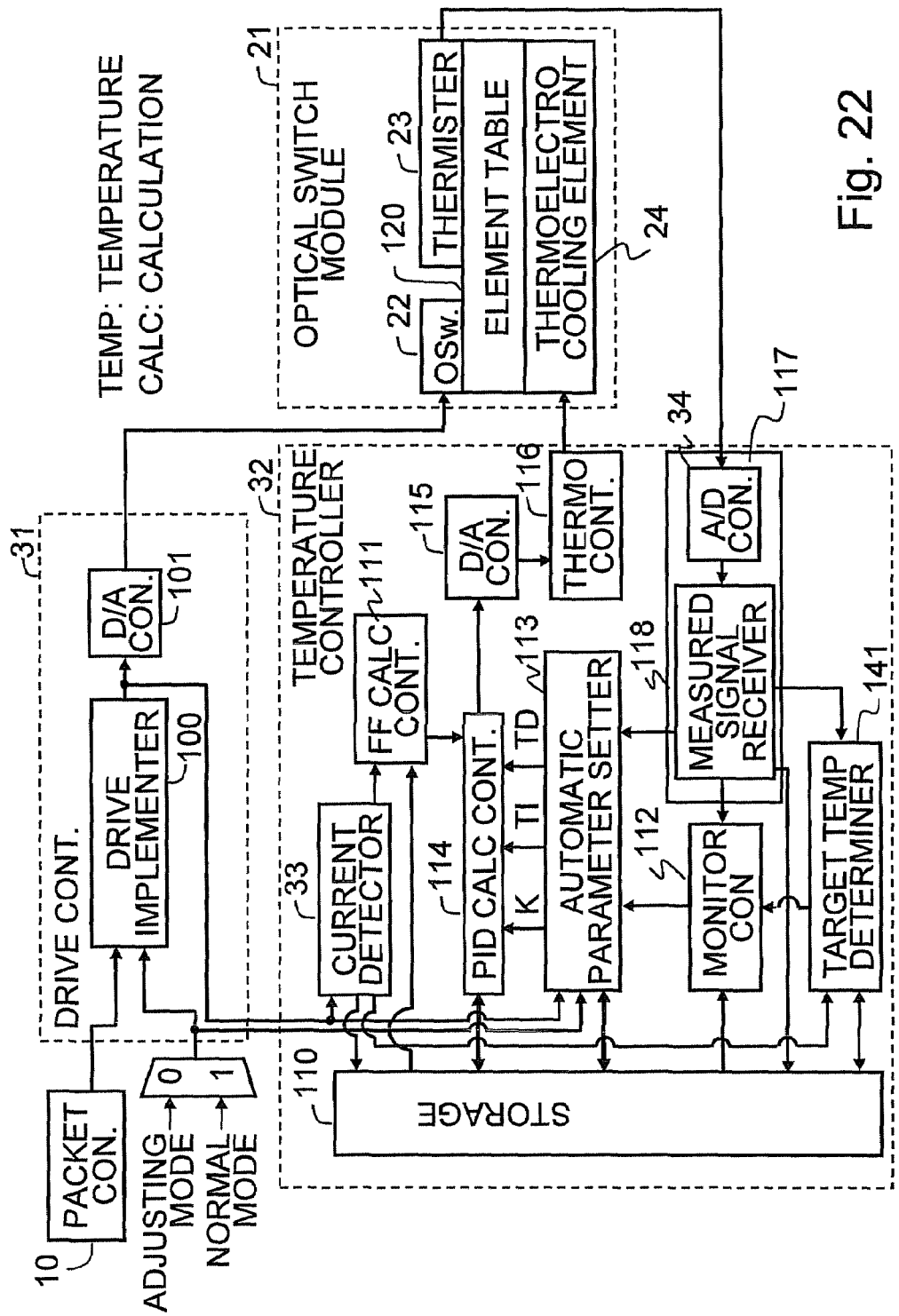
FIG. 22 is a block diagram illustrating a configuration of a drive controller, a thermo-controller, and an optical switch module according to the third embodiment.

An overview of an optical communication apparatus according to a third embodiment will now be described with reference to FIGS. 22 to 24. The same configurations as those described above are denoted by the same reference numerals, and descriptions thereof are not given below. FIG. 22 is a block diagram illustrating the configurations of a drive controller, a temperature controller, and an optical switch module in the third embodiment. FIG. 23 illustrates an amount-of-current monitor table and FIG. 24 illustrates a temperature monitor table.

An optical communication apparatus 1 according to the third embodiment has a configuration that is similar to the optical communication apparatus 1 according to the first embodiment described above with reference to FIG. 5. The optical communication apparatus 1 according to the third embodiment, however, is different from the optical communication apparatus 1 according to the first embodiment in that the temperature controller 32 further has a target-temperature determiner. The target-temperature determiner 141 is described below and differences from the first embodiment and the second embodiment are also described with respect to the current detector 33, the temperature detector 34, the monitor controller 112, and the storage 110 in the third embodiment.

The storage 110 in the third embodiment as in the first embodiment, stores, for each optical switch element 22, the data of a target temperature for the optical switch 22 during temperature control based on the feedback control, a temperature threshold for defining an allowable error for the target temperature, and a control parameter used during the feed-forward control.

The storage 110 in the third embodiment stores the data of three values including a high-temperature value, a low-temperature value, and a median value and the data for setting information indicating which value is selected, rather than storing a single fixed value for the target temperature used for temperature control based on the feedback control. An operator of the optical communication apparatus 1 performs pre-setting to store the data of the three target temperatures, i.e., the high-temperature value, the low-temperature value, and the median value, in the storage 110 and also the target-temperature determiner 141 performs setting to store the data for setting information in the storage 110. As described below, the target-temperature determiner 141 periodically makes a determination on the target temperature, and each time the target-temperature determiner 141 makes the determination, it stores setting information in the storage 110. Consequently, the target temperature is dynamically changed among the threes values, i.e., the high-temperature value, the low-temperature value, and the median value.

The storage 110 in the third embodiment stores an amount-of-current monitor table and a temperature monitor table. As described below, the current detector 33 in the third embodiment periodically detects the amount of current in the optical switch module 21, and each time the current detector 33 detects the amount of current, it stores the data of the detected amount of current in the amount-of-current monitor table in the storage 110 to thereby update the amount-of-current monitor table. The amount of current to the optical switch module 21 in this case refers to the amount of drive current supplied to the optical switch element 22. That is, as in the first embodiment, the current detector 33 detects a generation of drive current under the control of the drive controller 31 and also detects the amount of drive current. The temperature detector 34 periodically detects a temperature of the optical switch element 22. Each time the temperature detector 34 detects a temperature periodically, it stores the data of the detected temperature in the temperature monitor table in the storage 110 to thereby update the temperature monitor table.

For example, the amount-of-current monitor table stores, on a FIFO (first-in first-out) basis, information indicating the amounts of current for N generations, as illustrated in FIG. 23. For example, the temperature monitor table stores, on a FIFO basis, information indicating temperatures for the N generations, as illustrated in FIG. 24.

The current detector 33 periodically detects the amount of current flowing to the optical switch module 21. Each time the current detector 33 detects the amount of current, it stores the data of the detected amount of current in the amount-of-current monitor table in the storage 110 to thereby update the amount-of-current monitor table. The current detector 33 also refers to the amount-of-current monitor table to determine an average value of most-recent amounts of current and issues a notification indicating the determined most-recent amount-of-current average value to the target-temperature determiner 141.

The term "most-recent amount-of-current average value" as used herein refers to an average value of most recent few or several generations' values of the values stored in the amount-of-current monitor table. The reason why the most-recent amount-of-current average value, not a latest single temperature value, is used is to prevent a result of determination performed by the target-temperature determiner 141 from changing frequently by sensitively responding to minute changes. The number of generations for the averaging can be arbitrary set.

The temperature detector 34 in the third embodiment periodically detects the temperature of the optical switch module 21. Each time the temperature detector 34 detects the temperature, it stores the data of the detected temperature in the temperature monitor table in the storage 110 to thereby update the temperature monitor table. The temperature detector 34 also refers to the temperature monitor table to determine an average value of most-recent temperatures and issues a notification indicating the determined most-recent temperature average value to the target-temperature determiner 141.

The term "most-recent temperature average value" as used herein refers to an average value of most recent few or several generations' values of the values stored in the temperature monitor table. The reason why the most-recent temperature average value, not a latest single temperature value, is used is to prevent a result of determination performed by the target-temperature determiner 141 from changing frequently by sensitively responding to minute changes. The number of generations for the averaging can be arbitrary set.

The target-temperature determiner 141 determines which value of the three values, i.e., the high-temperature value, the low-temperature value, and the median value, is to be selected for the target temperature used for temperature control based on the feedback control. The target-temperature determiner 141 then stores a result of the determination in the storage 110 as the setting information to thereby dynamically change the target temperature.

More specifically, the target-temperature determiner 141 periodically receives the notification indicating the most-recent amount-of-current average value from the current detector 33, also periodically receives the notification indicating the most-recent temperature average value from the temperature detector 34. The target-temperature determiner 141 then determines which value is to be selected for the target temperature. That is, the target-temperature determiner 141 determines which of the three values, i.e., the high-temperature value, the low-temperature value, and the median value, is to be selected for the target temperature, in accordance with a predetermined algorithm based on a state of change in the amount of current and a state of change in a temperature. The target-temperature determiner 141 stores the setting information of the determined target temperature in the storage 110 and also issues, to the monitor controller 112, a notification indicating that monitor timing is reached. An algorithm for determining the target temperature is described below.

As in the first embodiment, the monitor controller 112 in the third embodiment determines whether or not the difference between the temperature value of the optical switch 22 and the target temperature is outside a temperature threshold range. Upon determining that the difference is outside the temperature threshold range, the monitor controller 112 issues a notification to the automatic parameter setter 113 so as to perform the feedback control. The monitor controller 112 in the third embodiment refers to the storage 110 in order to make a determination upon receiving the notification indicating that monitor timing is reached from the target-temperature determiner 141. In this case, however, the monitor controller 112 refers to a temperature value set for the target temperature, each time the target-temperature determiner 141 makes the determination, unlike the first embodiment in which the monitor controller 112 refers to the single fixed value.

That is, when the high-temperature value is set for the target temperature, the monitor controller 112 determines whether or not the difference between the temperature value of the optical switch 22 and the high-temperature value is outside the temperature threshold range. Upon determining that the difference is outside the temperature threshold range, the monitor controller 112 issues a notification to the automatic parameter setter 113 so as to perform the feedback control for adjusting the target temperature to the high-temperature value. Similarly, when the low-temperature value is set for the target temperature, the monitor controller 112 determines whether or not the difference between the temperature value of the optical switch 22 and the low-temperature value is outside the temperature threshold range. Upon determining that the difference is outside the temperature threshold range, the monitor controller 112 issues a notification to the automatic parameter setter 113 so as to perform the feedback control for adjusting the target temperature to the low-temperature value. Also, when the median value is set for the target temperature, the monitor controller 112 determines whether or not the difference between the temperature value of the optical switch 22 and the median value is outside the temperature threshold range. Upon determining that the difference is outside the temperature threshold range, the monitor controller 112 issues a notification to the automatic parameter setter 113 so as to perform the feedback control for adjusting the target temperature to the median value.

[Processing Procedure for Optical Communication Apparatus According to Third Embodiment]

Figure 25:
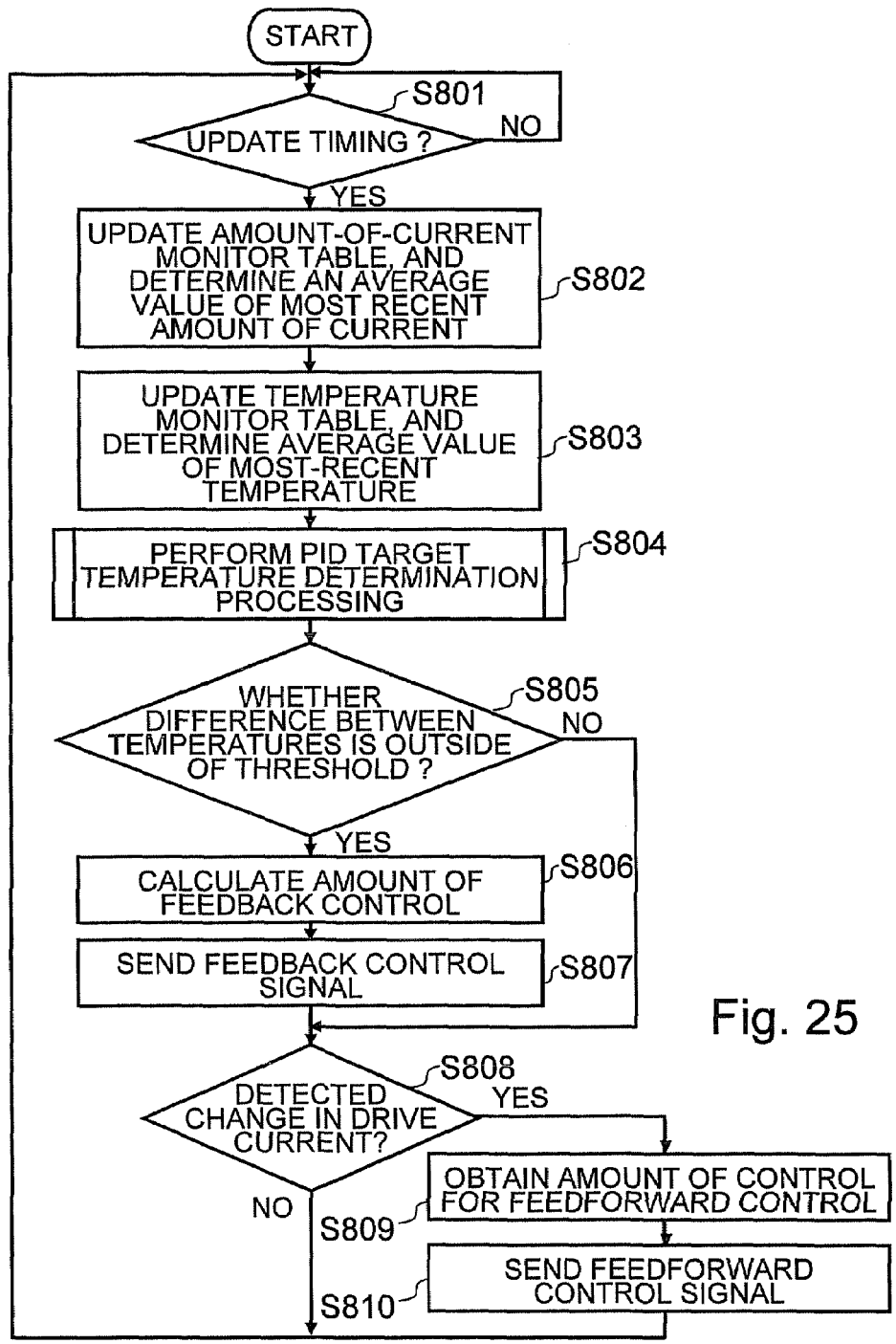
FIG. 25 is a process chart of thermo-control performed in a thermo-controller according the third embodiment.

A processing procedure for the temperature controller in the third embodiment will now be described with reference to FIG. 25. FIG. 25 is an operation chart illustrating one example of a processing procedure for the temperature controller in the third embodiment.

In the processing procedure described above in the first embodiment and illustrated in FIG. 8 as one example of the processing procedure for the temperature controller, the temperature controller initiates the processing by determining whether or not a generation of drive current is detected. In contrast, as illustrated in FIG. 25, the temperature controller in the third embodiment initiates processing by determining whether or not update timing is reached. Since the series of processing performed by the temperature controller is repeated in either of the first embodiment and the third embodiment, which processing is to be started first can be arbitrarily changed depending on the type of application.

As illustrated in FIG. 25, in the third embodiment, in S801, the current detector 33 and the temperature detector 34 determine whether or not update timing for the amount-of-current monitor table and the temperature monitor table is reached. When the current detector 33 and the temperature detector 34 determine that update timing is not reached (i.e., NO in S801), the process of the current detector 33 and the temperature detector 34 returns to the determination processing of S801.

On the other hand, when the current detector 33 and the temperature detector 34 determine that update timing is reached (i.e., YES in S801), the process proceeds to S802. In S802, the current detector 33 detects the amount of current flowing to the optical switch module 21, stores the data of the detected amount of current in the amount-of-current monitor table in the storage 110, and determines an average value of most-recent amounts of current. The current detector 33 issues a notification indicating the determined most-recent amount-of-current average value to the target-temperature determiner 141.

In S803, the temperature detector 34, on the other hand, detects a temperate of the optical switch module 21, stores the data of the detected temperature in the temperature monitor table in the storage 110, and determines an average value of most-recent temperatures. The temperature detector 34 issues a notification indicating the determined most-recent temperature average value to the target-temperature determiner 141.

The target-temperature determiner 141 receives the notification indicating the most-recent amount-of-current average value from the current detector 33 and receives the notification indicating the most-recent temperature average value from the temperature detector 34. Thus, in S804, the target-temperature determiner 141 performs PID (feedback control) target-temperature determination processing for determining which value is to be selected as the target temperature for the feedback control. An algorithm for determining the target temperature is described below in detail. The target-temperature determiner 141 stores setting information of the determined target temperature in the storage 110 and also issues, to the monitor controller 112, a notification indicating that monitor timing is reached.

Subsequently, when the monitor controller 112 receives, from the target-temperature determiner 141, the notification indicating that monitor timing is reached, the process proceeds to S805. In S805, the monitor controller 112 determines whether or not the difference between the temperature of the optical switch 22 and the target temperature is outside a temperature threshold range. At this point, the monitor controller 112 refers to the data in the storage 110, and when the high-temperature value is set for the target temperature, the monitor controller 112 determines whether or not the difference between the temperate value of the optical switch 22 and the high temperature value is outside the temperature threshold range. Similarly, when the low-temperature value is set for the target temperature, the monitor controller 112 determines whether or not the difference between the temperate value of the optical switch 22 and the low-temperature value is outside the temperature threshold range. When the median value is set for the target temperature, the monitor controller 112 determines whether or not the difference between the temperature value of the optical switch 22 and the median value is outside the temperature threshold range.

When a result of the determination shows that the difference is within the threshold range (i.e., NO in S805), the process proceeds to S808 in which the monitor controller 112 determines whether or not the current detector 33 has detected a change in the drive current.

On the other hand, when the result of the determination shows that the difference is outside the temperature threshold range (i.e., YES in S805) and when it is determined that the high temperature value is set for the target temperature, the monitor controller 112 issues a notification to the automatic parameter setter 113 so as to perform the feedback control for adjusting the target temperature to the high-temperature value. Similarly, upon determining that the low temperature value is set for the target temperature, the monitor controller 112 issues a notification to the automatic parameter setter 113 so as to perform the feedback control for adjusting the target temperature to the low-temperature value. When the median value is set for the target temperature, the monitor controller 112 issues a notification to the automatic parameter setter 113 so as to perform the feedback control for adjusting the target temperature to the median value.

As in the first embodiment, in S806, the PID computation controller 114 calculates the amount of feedback control corresponding to the difference between the temperature of the optical switch 22 and the target temperature. In S807, the temperature controller 32 outputs, to the thermoelectric cooling element 24, a feedback control signal corresponding to a result of the computation performed in S806.

Thereafter, as in the first embodiment, in S808, the monitor controller 112 determines whether or not the current detector 33 has detected a change in the drive current. When the current detector 33 detects a change in the drive current (i.e., YES in S808), the process proceeds to S809. In S809, the temperature controller 32 obtains information regarding the amount of control for the feedforward control, the information being stored in the storage 110. In S810, the temperature controller 32 outputs a feedforward control signal.

The temperature controller 32 in the third embodiment periodically repeats the processing from S801, as in the first embodiment.

[Algorithm for Determining Target Temperature]

An algorithm for determining the target temperature will be described next with reference to FIGS. 26 to 35.

[Target Temperature and Amount-Of-Current Thresholds]

Figure 26:
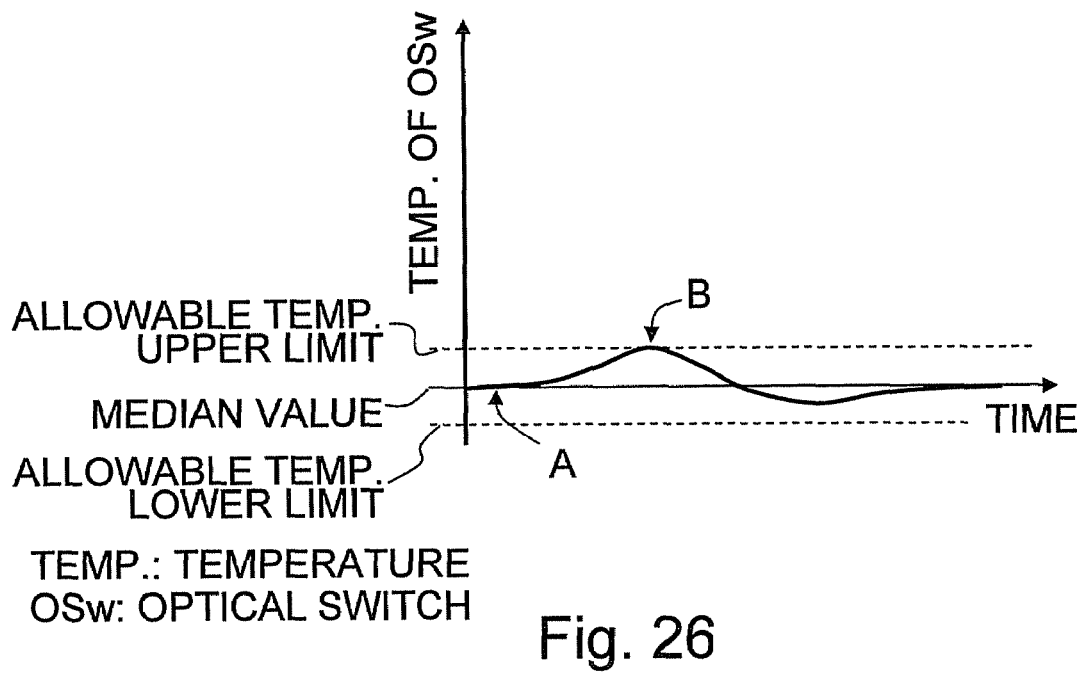
FIG. 26 is a diagram illustrating an example of a threshold 1 in a current value.
Figure 27:
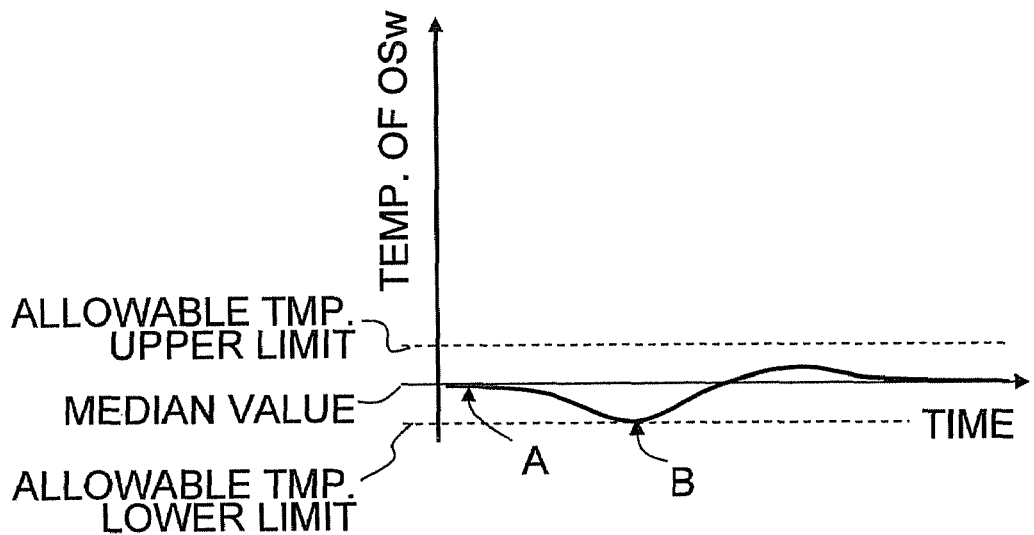
FIG. 27 is a diagram illustrating an example of a threshold 2 in a current value.

The target temperature and amount-of-current thresholds used for an algorithm for determining the target temperature will first be described with reference to FIGS. 26 to 29B. FIG. 26 illustrates a first amount-of-current threshold and FIG. 27 illustrates a second amount-of-current threshold. FIGS. 28A and 28B illustrate a low-temperature value and FIGS. 29A and 29B illustrate a high-temperature value.

In the third embodiment, character "I(th1)" illustrated in FIGS. 30A to 33C represents the first amount-of-current threshold. As illustrated in FIG. 26, the first amount-of-current threshold I(th1) corresponds to the amount of current whose peak in a temperature change appears right at an allowable temperature upper limit (indicated by B) when the amount of current increases in a case in which the target temperature is the median value (indicated by A). On the other hand, character "I(th2)" represents the second amount-of-current threshold. As illustrated in FIG. 27, the second amount-of-current threshold I(th2) corresponds to the amount of current whose peak in a temperature change appears right at an allowable temperature lower limit (indicated by B) when the amount of current decreases in a case in which the target temperature is the median value (indicated by A).

That is, the temperature controller 32 in the third embodiment is adapted to deal with a sharp change in the amount of current, and a sharp change in the amount of current can occur when the amount of current is high or low to some degree. In other words, it can be presumed that a sharp change in the amount of current does not occur when the amount of current is substantially at its medium level. Thus, in such a case, it is sufficient if the target temperature is set to the median value, as in a typical case.

Accordingly, the first amount-of-current threshold I(th1) and the second amount-of-current threshold I(th2) define the values of amounts of current in a case in which it is sufficient if the target temperature is set to the median value. The first and second amount-of-current thresholds have a relationship of I(th1)>I(th2). When the amount of current lies between the first amount-of-current threshold I(th1) and the second amount-of-current threshold I(th2), it is sufficient to set the target temperature to the median value as in the typical case.

FIGS. 26 and 27 show how the first amount-of-current threshold I(th1) and the second amount-of-current threshold I(th2) are determined. That is, when the amount of current is equal to the first amount-of-current threshold I(th1) in a case in which the target temperature is set to the median value, a peak in a temperature change appears right at the allowable temperature upper limit, as illustrated in FIG. 26. On other hand, when the amount of current is equal to the second amount-of-current threshold I(th2) in a case in which the target temperature is set to the median value, a peak in a temperature change appears right at the allowable temperature lower limit, as illustrated in FIG. 27.

In the third embodiment, the term "low-temperature value" for the target temperature refers to a temperature value obtained by subtracting, from the median value, a temperature width (indicated by A) that exceeds the allowable temperature upper-limit value when the amount of current changes from zero to a maximum in a state in which the temperature value has the median value, as illustrated in FIG. 28A. That is, with the target temperature being set to the low-temperature value, even when the amount of current changes from zero to a maximum (i.e., when the amount of current increases sharply), as illustrated in FIG. 28B, the range of allowable temperature increases has a margin and thus will not exceed the allowable temperature upper limit.

In the third embodiment, the term "high-temperature value" for the target temperature refers to a temperature value obtained by adding, to the median value, a temperature width (indicated by A) that falls below the allowable temperature lower-limit value when the amount of current changes from a maximum to zero in a state in which the temperature value has the median value, as illustrated in FIG. 29A. That is, with the target temperature being set to the high-temperature value, even when the amount of current changes from a maximum to zero (i.e., when the amount of current decreases sharply), as illustrated in FIG. 29B, the range of allowable temperature decreases has a margin and thus will not fall below the allowable temperature lower limit.

[Overview of Temperature Control]

An overview of the temperature control in the third embodiment will now be described with reference to FIGS. 30A to 33C. FIGS. 30A to 30C illustrate temperature control when the amount of current increases sharply. FIGS. 31A to 31C illustrate temperature control using a fixed target temperature. FIGS. 32A to 32C illustrate temperature control when the amount of current decreases sharply. FIGS. 33A to 33C illustrate temperature control using a fixed target temperature.

First referring to FIGS. 30A to 30C, temperature control will be described when the amount of current increases sharply. As illustrated in FIG. 30A, it is assumed that, in an initial state (between time t0 and time t1), the amount of current is stable between I(th1) and I(th2) and the temperature of the optical switch 22 has the median value.

In this case, at time t1, the amount of current decreases gently and reaches a value below I(th2), as indicated by A in FIG. 30B. In response, the temperature of the optical switch 22 also declines gently, and at this point in time, a sharp decrease in the amount of current is no more expected and the temperature of the optical switch 22 also may not fall below the allowable temperature lower limit. Accordingly, the temperature controller 32 in the third embodiment sets the target temperature to the low-temperature value in order to prepare for a sharp increase in the amount of current. As a result, the temperature of the optical switch 22 is guided toward the low-temperature value by the functioning of the feedforward control and the feedback control for adjusting the target temperature to the low-temperature value, and then converges to the low-temperature value, as indicated by B as illustrated in FIG. 30C.

Next, as illustrated in FIG. 30A, at time t2, the amount of current increases sharply and reaches a value exceeding I(th1). In response, the temperature of the optical switch 22 also increases sharply, as indicated by C in FIG. 30C. At this point in time, if the temperature controller 32 in the third embodiment sets the target temperature to the median value or the high-temperature value, an increase in the temperature is promoted. Thus, the temperature controller 32 in the third embodiment maintains the target temperature at the low-temperature value, as indicted by D in FIG. 30B.

In this case, although the temperature of the optical switch 22 also increases sharply, the range of allowable temperature increases has a margin because of the benefit of the temperature value converging to the low-temperature value by time t2. Consequently, in the third embodiment, because of the functioning of the feedforward control and the feedback control for adjusting the target temperature to the low-temperature value, the temperature of the optical switch 22 does not exceed the allowable temperature upper limit, as indicated by E in FIG. 30C.

In a period between time t3 to time t4, the amount of current still has a value exceeding I(th1) as illustrated in FIG. 30A, but the temperature of the optical switch 22 then stops increasing and converges to a value. In response, at this time, the temperature controller 32 in the third embodiment sets the target temperature to the high-temperature value, as indicated by F in FIG. 30B, in order to prepare for a sharp decrease in the amount of current. Consequently, the temperature of the optical switch 22 is guided toward the high-temperature value by the functioning of the feedforward control and the feedback control for adjusting the target temperature to the high-temperature value, and then converges to the high-temperature value, as indicted by G in FIG. 30C.

Thereafter, when the amount of current changes to a value between I(th1) and I(th2) at time t4 as illustrated in FIG. 30A, the temperature controller 32 in the third embodiment sets the target temperature to the median value as in the typical case, as indicated by H in FIG. 30B. Consequently, the temperature of the optical switch 22 is guided toward the median value by the functioning of the feedforward control and the feedback control for adjusting the target temperature to the median value, and then converges to the median value, as indicated by I in FIG. 30C.

On the other hand, if no such control is performed, the temperature of the optical switch 22 changes as illustrated in FIGS. 31A to 31C.

As illustrated in FIG. 31A, it is assumed that, in an initial state (between time t0 to time t1), the target temperature is set to the median value, as indicated by A in FIG. 31B, the amount of current is stable between I(th1) and I(th2), and the temperature of the optical switch 22 also has the median value, as indicated by B in FIG. 31C.

In this case, at time t1, the amount of current decreases gently and reaches a value below I(th2) as illustrated in FIG. 31A and the temperature of the optical switch 22 also declines gently, as indicated by C in FIG. 31C. Consequently, the temperature of the optical switch 22 is guided toward the median value by the functioning of the feedforward control and the feedback control for adjusting the target temperature to the median value, and then converges to the median value, as indicated by D in FIG. 31C.

Next, at time t2, the amount of current increases sharply and reaches a value exceeding I(th1) as illustrated in FIG. 31A. In response, the temperature of the optical switch 22 also increases sharply as indicated by F in FIG. 31C. At this point in time, since the target temperature is maintained at the median value by the temperature control, the temperature of the optical switch 22 is guided toward the median value by the functioning of the feedforward control and the feedback control for adjusting the target temperature to the median value. However, since the change in the amount of current at time t2 is significant, the functioning of the feedforward control and the feedback control for adjusting the target temperature to the median value is not effected in time and thus the temperature of the optical switch 22 exceeds the allowable temperature upper limit, as indicated by G in FIG. 31C.

Thereafter, at time t3, the amount of current decreases and, when the amount of current reaches a value between I(th1) and I(th2) as illustrated in FIG. 31A, the temperature of the optical switch 22 starts declining and the temperature of the optical switch 22 then converges to the median value (as indicated by H) by the functioning of the feedforward control and the feedback control for adjusting the target temperature to the median value as illustrated in FIG. 31C.

As described above, when the amount of current increases sharply under the temperature control using a fixed target temperature, the temperature of the optical switch 22 exceeds the allowable temperature upper limit. To date, to what degree changes in the amount of current can be included in the allowable range for the temperature control as described above has been dependent on the cooling capability of the thermoelectric cooling element 24 and the heat capacities of components included in the optical switch element 22. In contrast, according to the third embodiment, the target temperature for the feedback control is dynamically changed to thereby more appropriately control the temperature of the optical switch element 22. Thus, when the amount of current increases sharply, it is possible to stably output an optical signal.

Temperature control when the amount of current decreases sharply will be described next with reference to FIGS. 32A to 32C. As illustrated in FIG. 32A, it is assumed that, in an initial state (between t0 to time t1), the amount of current is stable between I(th1) and I(th2) and the temperature of the optical switch 22 is also has the median value as illustrated in FIG. 32C.

In this case, at time t1, the amount of current increases gently and reaches a value exceeding I(th1), as indicated by A. In response, the temperature of the optical switch 22 also increases gently as illustrated in FIG. 32C, and at this point in time, a sharp increase in the amount of current is no more expected and the temperature of the optical switch 22 also may not exceed the allowable temperature upper limit. Accordingly, the temperature controller 32 in the third embodiment sets the target temperature to the high-temperature value in order to prepare for a sharp decrease in the amount of current as illustrated in FIG. 32B. As a result, the temperature of the optical switch 22 is guided toward the high-temperature value by the functioning of the feedforward control and the feedback control for adjusting the target temperature to the high-temperature value, and then converges to the high-temperature value, as indicated by B in FIG. 32C.

Next, as illustrated in FIG. 32A, at time t2, the amount of current decreases sharply and reaches a value below I(th2). In response, the temperature of the optical switch 22 also decreases sharply, as indicated by C as illustrated in FIG. 32C. At this point in time, if the temperature controller 32 in the third embodiment sets the target temperature to the median value or the low-temperature value, a decrease in the temperature is promoted. Thus, the temperature controller 32 in the third embodiment maintains the target temperature at the high-temperature value, as indicated by D as illustrated in FIG. 32B.

In this case, although the temperature of the optical switch 22 also decreases sharply, the range of allowable temperature decreases has a margin because of the benefit of the temperature value converging to the high-temperature value by time t2. Consequently, in the third embodiment, because of the functioning of the feedforward control and the feedback control for adjusting the target temperature to the high-temperature value, the temperature of the optical switch 22 does not fall below the allowable temperature lower limit, as indicated by E as illustrated in FIG. 32C.

In a period between time t3 to time t4, the amount of current still has a value below I(th2) as illustrated in FIG. 32A, but the temperature of the optical switch 22 then stops decreasing and converges to a value. In response, at this time, the temperature controller 32 in the third embodiment sets the target temperature to the low-temperature value, as indicated by F in FIG. 32B, in order to prepare for a sharp increase in the amount of current. Consequently, the temperature of the optical switch 22 is guided toward the low temperature value by the functioning of the feedforward control and the feedback control for adjusting the target temperature to the low-temperature value, and then converges to the low-temperature value, as indicated by G in FIG. 32C.

Thereafter, when the amount of current changes to a value between I(th1) and I(th2) at time t4 as illustrated in FIG. 32A, the temperature controller 32 in the third embodiment sets the target temperature to the median value (as indicated by H in FIG. 32B), as in the typical case. Consequently, the temperature of the optical switch 22 is guided toward the median value by the functioning of the feedforward control and the feedback control for adjusting the target temperature to the median value, and then converges to the median value, as indicated by I as illustrated in FIG. 32C.

On the other hand, if no such control is performed, the temperature of the optical switch 22 changes as illustrated in FIGS. 33A to 33C.

As illustrated in FIG. 33B, it is assumed that, in an initial state (between time t0 to time t1), the target temperature is set to the median value, as indicated by A, the amount of current is stable between I(th1) and I(th2) as illustrated FIG. 33A, and the temperature of the optical switch 22 also has the median value, as indicated by B in FIG. 33B.

In this case, at time t1, the amount of current increases gently and reaches a value exceeding I(th1) as illustrated in FIG. 33A, and the temperature of the optical switch 22 also increases gently, as indicated by C in FIG. 33C. However, the temperature of the optical switch 22 is guided toward the median value by the functioning of the feedforward control and the feedback control for adjusting the target temperature to the median value as illustrated in FIG. 33B, and then converges to the median value, as indicted by D in FIG. 33C.

Next, as illustrated in FIG. 33A, at time t2, the amount of current decreases sharply and reaches a value below I(th2). In response, the temperature of the optical switch 22 also decreases sharply, as indicated by F in FIG. 33C. At this point in time, since the target temperature is maintained at the median value by the temperature control as illustrated in FIG. 33B, the temperature of the optical switch 22 is guided toward the median value by the functioning of the feedforward control and the feedback control for adjusting the target temperature to the median value. However, since the change in the amount of current at time t2 is significant, the functioning of the feedforward control and the feedback control for adjusting the target temperature to the median value is not effected in time and thus the temperature of the optical switch 22 falls below the allowable temperature lower limit, as indicated by G in FIG. 33C.

Thereafter, at time t3, the amount of current increases and, when the amount of current reaches a value between I(th1) and I(th2) as illustrated in FIG. 33A, the temperature of the optical switch 22 starts increasing and the temperature of the optical switch 22 then converges to the median value, as indicated by H as illustrated in FIG. 33C, by the functioning of the feedforward control and the feedback control for adjusting the target temperature to the median value.

As described above, when the amount of current decreases sharply under the temperature control using a fixed target temperature, the temperature of the optical switch 22 falls below the allowable temperature lower limit. To date, to what degree changes in the amount of current can be included in the allowable range for the temperature control as described above has been dependent on the cooling capability of the thermoelectric cooling element 24 and the heat capacities of components included in the optical switch element 22. In contrast, according to the third embodiment, the target temperature for the feedback control is dynamically changed to thereby more appropriately control the temperature of the optical switch element 22. Thus, when the amount of current decreases sharply, it is possible to stably output an optical signal.

[Processing Procedure for Determining Target Temperature]

Figure 35:
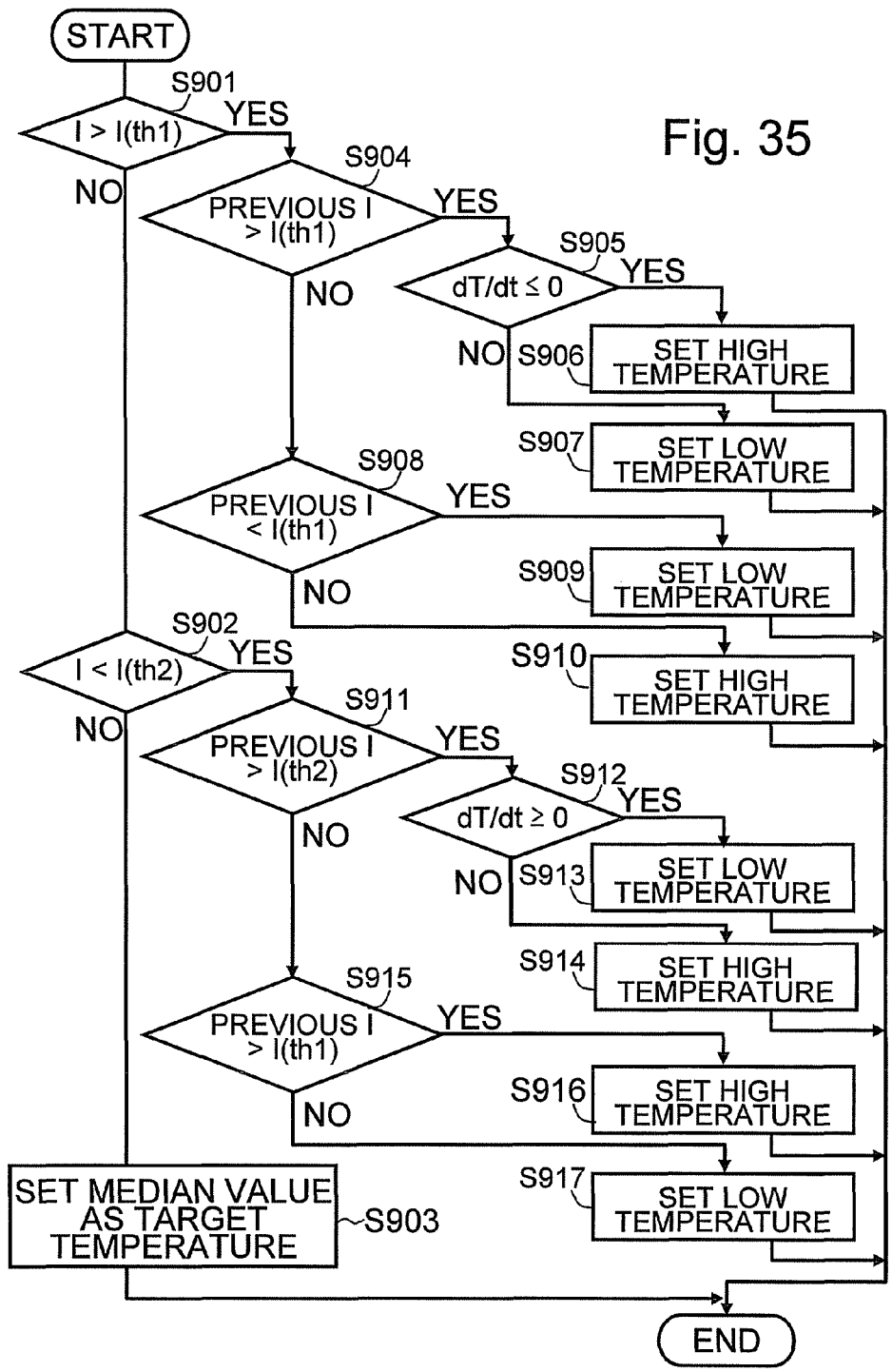
FIG. 35 is a process chart illustrating an algorithm for determining a target temperature.

A processing procedure (corresponding to S804 in FIG. 25) for determining the target temperature will now be described with reference to FIGS. 34 and 35. FIG. 34 illustrates an algorithm for determining the target temperature and FIG. 35 is an operation chart illustrating the algorithm for determining the target temperature.

As described above with reference to FIGS. 30 and 32, the temperature controller 32 in the third embodiment determines which value is to be selected for the target temperature and performs setting, on the basis of the amount of present current, a process of reaching the amount of present current, the temperature of the optical switch element 22, and so on. FIG. 34 illustrates a summary of the determination and the setting.

That is, when the amount of present current exceeds I(th1) (i.e., the state of current I is large) and this state continues (i.e., a state before current I is large), the temperature controller 32 in the third embodiment further makes a determination using a rate of change per time in the temperature of the optical switch element 22. That is, a case in which the rate of change per time indicates a converging or a decline corresponds to the case at time t3 illustrated in FIG. 30A, and thus the temperature controller 32 sets the target temperature to the high-temperature value in order to prepare for a sharp decrease in the amount of current. On the other hand, a case in which the rate of change per time indicates an increase corresponds to a case between time t2 and t3 illustrated in FIG. 30A, and thus the temperature controller 32 sets the target temperature to the low-temperature value so as to maintain the low-temperature value.

A case in which the amount of present current exceeds I(th1) (i.e., the state of current I is large) and a change to this state is significant (i.e., the state before current I is small) corresponds to the case at time t2 in FIG. 32A, and thus the temperature of the optical switch 22 are supposedly already guided toward the low-temperature value. Thus, the temperature controller 32 in the third embodiment sets the target temperature to the low-temperature value so as to maintain the low-temperature value.

A case in which the amount of present current exceeds I(th1) (i.e., the state of current I is large) and a change to this state is gentle (i.e., the state before current I is medium) corresponds to case at t1 in FIG. 32A, and thus the temperature controller 32 in the third embodiment sets the target temperature to the high-temperature value in order to prepare for a sharp decrease in the amount of current.

On the other hand, when the amount of present current falls below I(th2) (i.e., the state of current I is small) and this state continues (i.e., the state before current I is small), the temperature controller 32 in the third embodiment further makes a determination using the rate of change per time in the temperature of the optical switch element 22. That is, a case in which the rate of change per time indicates a converging or an increase corresponds to the case at time t3 illustrated in FIG. 32A, and thus the temperature controller 32 sets the target temperature to the low-temperature value in order to prepare for a sharp increase in the amount of current. On the other hand, when the amount of current decreases sharply in a state in which the target temperature is set to the high temperature value, for example, when the amount of current has a value between t2 and t3 in FIG. 32A in which the rate of change per time indicates a decline, the temperature controller 32 sets the target temperature to the high-temperature value so as to maintain the high-temperature value.

A case in which the amount of present current falls below I(th2) (i.e., the state of current I is small) and a change to this state is significant (i.e., the state before current I is large) corresponds to a case at t2 in FIG. 32A and thus the temperature of the optical switch 22 are supposedly already guided toward the high-temperature value. Thus, the temperature controller 32 in the third embodiment sets the target temperature to the high-temperature value so as to maintain the high-temperature value.

A case in which the amount of present current falls below I(th2) (i.e., the state of current I is small) and a change to this state is gentle (i.e., the state before current I is medium) corresponds to the case at time t1 in FIG. 30A, and thus the temperature controller 32 in the third embodiment sets the target temperature to the low-temperature value in order to prepare for a sharp increase in the amount of current.

When the amount of present current has a value between I(th1) and I(th2), the temperature controller 32 in the third embodiment sets the target temperature to the median value, as in the typical case.

FIG. 35 is an operation chart illustrating the above-described operation as a processing procedure performed by the temperature controller 32. FIG. 35 corresponds to S804 in FIG. 25. Character "I" illustrated in FIG. 35 indicates the most-recent amount-of-current average value determined by the current detector 33. Character "T" indicates the most-recent temperature average value determined by the temperature detector 34. Character "dT/dt" indicates the rate of change per time.

As illustrated in FIG. 35, in S901, the target-temperature determiner 141 first determines whether or not the most-recent amount-of-current average value I indicated by the notification received from the current detector 33 exceeds I(th1). When the most-recent amount-of-current average value I falls below I(th1) (i.e., NO in S901), the process proceeds to S902 in which the target-temperature determiner 141 determines whether or not the most-recent amount-of-current average value indicated by the notification received from the current detector 33 falls below I(th2). When the most-recent amount-of-current average value I exceeds I(th2) (i.e., NO in S902), the target-temperature determiner 141 sets the target temperature to the median value in S903.

When it is determined in S901 that the most-recent amount-of-current average value I exceeds I(th1) (i.e., YES in S901), the process proceeds to S904 in which the target-temperature determiner 141 determines whether or not the amount of current at previous time, i.e., in the state before I, exceeds I(th1).

When it is determined that the amount of current in the state before I exceeds I(th1) (i.e., YES in S904), the process proceeds to S905 in which the target-temperature determiner 141 determines whether or not the rate of change per time for the most-recent temperature average value T is smaller than or equal to zero. Upon determining that the rate of change per time is smaller than or equal to zero (i.e., YES in S905), the target-temperature determiner 141 sets the target temperature to the high-temperature value in S906. Upon determining that the rate of change per time is greater than zero (i.e., NO in S905), the target-temperature determiner 141 sets the target temperature to the low-temperature value in S907.

On the other hand, when it is determined in S904 that the amount of current in the state before I falls below I(th1) (i.e., NO in S904), the process proceeds to S908 in which the target-temperature determiner 141 determines the amount of current in the state before I falls below I(th2). Upon determining that the amount of current in the state before I falls below I(th2) (i.e., YES in S908), the target-temperature determiner 141 sets the target temperature to the low-temperature value in S909. Upon determining that the amount of current in the state before I exceeds I(th2) (i.e., NO in S908), the target-temperature determiner 141 sets the target temperature to the high-temperature value in S910.

When it is determined in S901 that the most-recent amount-of-current average value I falls below I(th1) (i.e., NO in S901) and when it is determined in S902 that the most-recent amount-of-current average value I falls below I(th2) (i.e., YES in S902), the process proceeds to S911 in which the target-temperature determiner 141 determines whether or not the amount of current at previous time (i.e., in the state before I) falls below I(th2).

Upon determining that the amount of current in the state before I falls below I(th2) (i.e., YES in S911), the process proceeds to S912 in which the target-temperature determiner 141 determines whether or not the rate of change per time for the most-recent temperature average value T is greater than or equal to zero. Upon determining that the rate of change per time is greater than or equal to zero (i.e., YES in S912), the target-temperature determiner 141 sets the target temperature to the low-temperature value in S913. Upon determining that the rate of change per time is smaller than zero (i.e., NO in S912), the target-temperature determiner 141 sets the target temperature to the high-temperature value in S914.

On the other hand, upon determining that the amount of current in the state before I falls below I(th2) (i.e., NO in S911), the process proceeds to S915 in which the target-temperature determiner 141 determines whether or not the amount of current in the state before I exceeds I(th1). Upon determining that the amount of current in the state before I exceeds I(th1) (i.e., YES in S915), the target-temperature determiner 141 sets the target temperature to the high-temperature value in S916. Upon determining that the amount of current in the state before I falls below I(th1) (i.e., NO in S915), the target-temperature determiner 141 sets the target temperature to the low-temperature value in S917.

[Advantage of Third Embodiment]

As described above, the optical communication apparatus 1 according to the third embodiment dynamically changes a target temperature for the feedback control (i.e., determines a target temperature that is different from a predetermined target temperature) on the basis of the amount of current supplied to the optical switch module 21. As a result, the optical communication apparatus 1 can more appropriately control the temperature of the optical switch element 22. Thus, even when the amount of current changes sharply, it is possible to adjust the temperature of the optical switch 22 to a temperature in the allowable range. It is also possible to deal with a case in which the allowable range is exceeded with temperature control using a fixed target temperature. Furthermore, the optical communication apparatus 1 according to the third embodiment can more stably output an optical signal, thus making it possible to improve the quality of communication using an optical switch module.

Fourth Embodiment

Although some embodiments of the present invention have been described above with reference to the accompanying drawings, the embodiments are exemplary and illustrative. The present invention can also be implemented by not only the modes disclosed herein but also other modes to which various changes and modifications are made on the basis of knowledge of those skilled in the art.

For example, although a case in which the temperature controller 32 determines a driving state of the drive controller through detection of the digital signal output from the drive setter 100 has been described above, a method for determining the driving state of the drive controller is not limited thereto. For example, the temperature controller 32 can also detect a generation of drive current on the basis of the port connection information. In such a case, the current detector 33 detects the port connection information output from the optical packet converter 10. The temperature controller 32 may also directly detect drive current input to the optical switch element 22. In such a case, the current detector 33 detects an analog electrical signal output from the D/A converter 101 to the optical switch element 22.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical communication apparatus comprising:
   an optical signal transmitter to output an optical signal;
   an optical switch device to perform route switching of the optical signal outputted from the optical signal transmitter;
   a drive controller to supply a drive current to the optical switch device to control the route switching performed by the optical switch device;
   a cooling device to cool the optical switch device on the basis of a control signal provided to the cooling device;
   a temperature controller to provide the control signal to the cooling device to keep a measured temperature related to a temperature of the optical switch at a predetermined temperature in accordance with feedforward control based on a drive state of the drive controller and feedback control based on the measured temperature.

2. The optical communication apparatus according to claim 1, further comprising:
   an optical amplifier to amplify the optical signal;
   a signal level detector to detect values of the optical signal inputted into the optical switch device and the optical signal outputted from the optical switch device; and
   a gain controller to control a gain for amplifying the optical signal by the optical amplifier on the basis of the values detected by the signal level detector, and to output a control signal to the optical amplifier for amplifying the optical signal during a predetermined period according to the driving state of the drive controller regardless of a result detected by the signal level detector.

3. The optical communication apparatus according to claim 1, further comprising:
   a feedforward controller to perform the feedforward control on the basis of a proportional coefficient, an integral coefficient, and a differential coefficient, wherein the proportional coefficient is determined on the basis of a temperature difference between a stable temperature of the optical switch and the predetermined temperature in a state of on applying the drive current to the optical switch device, the integral coefficient is determined on the basis of the proportional coefficient and the temperature difference, and the differential coefficient is determined on the basis of the proportional coefficient, the integral coefficient and a maximum elevated temperature of the optical switch device in the state of on applying the drive current to the optical switch device.

4. The optical communication apparatus according to claim 1, further comprising:
   a temperature detector to detect a temperature of the optical switch device and thereby provide said measured temperature; and
   a feedback controller to perform the feedback control according to the temperature detected by the temperature detector.

5. The optical communication apparatus according to claim 1, wherein the temperature controller sets a temperature different from the predetermined temperature on the basis of an amount of the drive current provided to the optical switch device when the temperature of the optical switch tends to converge to a temperature.

6. A control apparatus for a communication apparatus including an optical switch device to perform route switching of an optical signal and a cooling device to cool the optical switch device, the control apparatus comprising:
   a drive controller to supply a drive current to the optical switch device to control the route switching performed by the optical switch device;
   a cooling device to cool the optical switch device on the basis of a control signal supplied to the cooling device; and a feedforward controller to supply the control signal to the cooling device to maintain a temperature of the optical switch device to a predetermined temperature according to a drive state of the drive controller.

7. The control apparatus according to claim 6, further comprising:
an optical signal transmitter to output the optical signal so that the outputted optical signal is input to the optical switch device, the optical switch device performs the route switching and then outputs the optical signal;
an optical amplifier to amplify the optical signal outputted from the optical signal transmitter;
a signal level detector to detect values of the optical signal inputted into the optical switch device and the optical signal outputted from the optical switch device; and
a gain controller to control a gain for amplifying the optical signal by the optical amplifier on the basis of the values detected by the signal level detector, and to output a control signal to the optical amplifier for amplifying the optical signal during a predetermined period according to the driving state of the drive controller regardless of a result detected by the signal level detector.

8. The control apparatus according to claim 6, wherein:
the feedfoward controller is controlled on the basis of a proportional coefficient, an integral coefficient, and a differential coefficient, wherein the proportional coefficient is determined on the basis of a temperature difference between a stable temperature of the optical switch device and the predetermined temperature in a state of on applying the drive current to the optical switch device, the integral coefficient is determined on the basis of the proportional coefficient and the temperature difference, and the differential coefficient is determined on the basis of the proportional coefficient, the integral coefficient and a maximum elevated temperature of the optical switch device in the state of on applying the drive current to the optical switch device.

9. The control apparatus according to claim 6, further comprising:
a temperature detector to detect a temperature of the optical switch device; and
a feedback controller to cause the cooling device to maintain the optical switch device at a predetermined temperature according to the temperature detected by the temperature detector.

10. A method for stabilizing power of an optical signal in an optical communication apparatus, the method comprising:
supplying a drive current from a drive controller to an optical switch device to control route switching of the optical signal by the optical switch device; and
applying, by a feedforward controller, a control signal to a cooling device to maintain a temperature of the optical switch device to a predetermined temperature according to a drive state of the drive controller.

11. The optical communication apparatus according to claim 1, further comprising:
a feedback controller to perform the feedback control by setting a temperature different from the predetermined temperature on the basis of an amount of the drive current supplied to the optical switch device when the temperature of the optical switch tends to converge to a temperature.

12. The optical communication apparatus according to claim 11, wherein the predetermined temperature is selected from a first temperature corresponding to a upper limit in an allowable temperature of the optical switch device, a second temperature corresponding lower limit in the allowable temperature, or a median temperature of the allowable temperature.

* * * * *

UNITED STATES PATENT AND TRADEMARK OFFICE
CERTIFICATE OF CORRECTION

| | | |
|---|---|---|
| PATENT NO. | : 8,301,035 B2 | Page 1 of 1 |
| APPLICATION NO. | : 12/558780 | |
| DATED | : October 30, 2012 | |
| INVENTOR(S) | : Keisuke Harada et al. | |

It is certified that error appears in the above-identified patent and that said Letters Patent is hereby corrected as shown below:

Column 29, Line 24, In Claim 8, delete "feedfoward" and insert -- feedforward --, therefor.

Signed and Sealed this
Twenty-second Day of January, 2013

David J. Kappos
*Director of the United States Patent and Trademark Office*